United States Patent
Kim et al.

(10) Patent No.: US 10,834,749 B2
(45) Date of Patent: Nov. 10, 2020

(54) METHOD FOR BANDWIDTH PART MANAGEMENT IN COMMUNICATION SYSTEM AND APPARATUS FOR THE SAME

(71) Applicant: ELECTRONICS AND TELECOMMUNICATIONS RESEARCH INSTITUTE, Daejeon (KR)

(72) Inventors: Eunkyung Kim, Daejeon (KR); Tae Joong Kim, Daejeon (KR); Hyun Seo Park, Daejeon (KR); An Seok Lee, Daejeon (KR); Yu Ro Lee, Daejeon (KR); Hyun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 43 days.

(21) Appl. No.: 16/277,228

(22) Filed: Feb. 15, 2019

(65) Prior Publication Data
US 2019/0261406 A1 Aug. 22, 2019

(30) Foreign Application Priority Data

Feb. 19, 2018 (KR) .................. 10-2018-0019494
May 11, 2018 (KR) .................. 10-2018-0054331
(Continued)

(51) Int. Cl.
*H04W 72/12* (2009.01)
*H04W 72/04* (2009.01)
(Continued)

(52) U.S. Cl.
CPC ..... *H04W 72/1289* (2013.01); *H04L 27/2666* (2013.01); *H04W 72/042* (2013.01);
(Continued)

(58) Field of Classification Search
CPC ............. H04W 72/1289; H04W 76/27; H04W 72/042; H04L 27/2666
See application file for complete search history.

(56) References Cited

U.S. PATENT DOCUMENTS 9,572,106 B2  2/2017  Ang et al.
9,609,672 B2  3/2017  Park et al.
(Continued)

FOREIGN PATENT DOCUMENTS

WO   WO-2019134664 A1 * 7/2019 ............ H04W 74/08

OTHER PUBLICATIONS

"MediaTek Inc", "Remaining Details on Bandwidth Part Operation in NR", 3GPP TSG RAN WG1 Meeting NR#3, Nagoya, Japan, Sep. 18-21, 2017, R1-1716202 (Year: 2017).*
(Continued)

*Primary Examiner* — Siming Liu
(74) *Attorney, Agent, or Firm* — LRK Patent Law Firm

(57) ABSTRACT

An operation method of a terminal in a communication system includes receiving bandwidth part (BWP) change information from a base station in a BWP i; changing an operation BWP of the terminal from the BWP i to a BWP j even when a transmission and reception procedure of first data in the BWP i is not completed at a BWP changing point indicated by the BWP change information; and performing a data transmission and reception procedure of second data in the BWP j, wherein the BWP i and the BWP j are different BWPs, and i and j are different integers.

5 Claims, 30 Drawing Sheets

(30) Foreign Application Priority Data

Nov. 26, 2018 (KR) .......................... 10-2018-0147830
Jan. 10, 2019 (KR) .......................... 10-2019-0003404
Feb. 14, 2019 (KR) .......................... 10-2019-0016979

(51) Int. Cl.
*H04L 27/26* (2006.01)
*H04W 76/27* (2018.01)

(52) U.S. Cl.
CPC ... *H04W 72/0446* (2013.01); *H04W 72/0453* (2013.01); *H04W 76/27* (2018.02)

(56) References Cited

U.S. PATENT DOCUMENTS

| | | |
|---|---|---|
| 9,894,651 B2 | 2/2018 | Novlan et al. |
| 2015/0146615 A1* | 5/2015 | Yu .............................. H04L 5/14 |
| | | 370/328 |
| 2015/0188650 A1 | 7/2015 | Au et al. |
| 2016/0227571 A1 | 8/2016 | Baek et al. |
| 2017/0013610 A1 | 1/2017 | Lee et al. |
| 2017/0105216 A1 | 4/2017 | Jung et al. |
| 2019/0149305 A1* | 5/2019 | Zhou ..................... H04L 5/0048 |
| | | 370/330 |

OTHER PUBLICATIONS

Jeongho Jeon, "NR Wide Bandwidth Operations", IEEE Communications Magazine on Key Technologies for 5G New Radio, 2017.

* cited by examiner

— : LATENCY PATH OF INDIRECT RADIO TRANSMISSION
----- : INDIRECT RADIO SECTION
—·— : LATENCY PATH OF DIRECT RADIO TRANSMISSION
······· : DIRECT RADIO SECTION
— — — : LATENCY PATH IN APPLICATION PROCESSING

METHOD FOR BANDWIDTH PART MANAGEMENT IN COMMUNICATION SYSTEM AND APPARATUS FOR THE SAME

CROSS-REFERENCE TO RELATED APPLICATIONS

This application claims priority to Korean Patent Application Nos. 10-2018-0019494, filed Feb. 19, 2018, 10-2018-0054331, filed May 11, 2018, 10-2018-0147830, filed Nov. 26, 2018, 10-2019-0003404, filed Jan. 10, 2019, and 10-2019-0016979, filed Feb. 14, 2019, in the Korean Intellectual Property Office (KIPO), the entire contents of which are hereby incorporated by reference.

BACKGROUND

1. Technical Field

The present disclosure relates to a technique for a bandwidth part (BWP) management in a communication system, and more specifically, to a technique of changing or switching a BWP for preventing transmission latency of data and securing transmission reliability of data.

2. Description of Related Art

With the development of information and communication technology, various wireless communication technologies are being developed. Typical wireless communication technologies include long term evolution (LTE), new radio (NR), etc. defined in the 3rd generation partnership project (3GPP) standard. The LTE may be one of the fourth generation (4G) wireless communication technologies, and the NR may be one of the fifth generation (5G) wireless communication technologies.

The 5G communication system (e.g., the communication system supporting the NR) using a frequency band (e.g., frequency band above 6 GHz) higher than a frequency band (e.g., frequency band below 6 GHz) of the 4G communication system (e.g., the communication system supporting the LTE) as well as the frequency band of the 4G communication system is being considered for processing of rapidly increasing wireless data after commercialization of the 4G communication system. The 5G communication system can support enhanced mobile broadband (eMBB) services, ultra-reliable and low-latency communication (URLLC) service, and massive machine type communication (mMTC) services.

There is a need for a method to improve the quality of the communication service as the number of users of the communication system increases. In order to improve the quality of the communication service, a method for reducing transmission latency, a method for improving reliability by improving (re)transmission performance of data, a method for providing communication services having flexibility and scalability in consideration of characteristics of terminals and characteristics of the communication services, a method for providing communication services by reflecting a frequency operation regulation and frequency characteristics of frequency bands, and a method for transmitting high-speed data (or high-capacity data) according to a user's request are required.

In particular, if a data transmission procedure is not completed in a current bandwidth part (BWP) at the time of changing or switching the current BWP to another BWP, management method of a BWP to prevent data transmission latency and to secure data transmission reliability will be required.

SUMMARY

Accordingly, embodiments of the present disclosure provide a method and an apparatus for a bandwidth part (BWP) management in a communication system.

In order to achieve the objective of the present disclosure, an operation method of a terminal in a communication system may comprise receiving bandwidth part (BWP) change information from a base station in a BWP i; changing an operation BWP of the terminal from the BWP i to a BWP j even when a transmission and reception procedure of first data in the BWP i is not completed at a BWP changing point indicated by the BWP change information; and performing a data transmission and reception procedure of second data in the BWP j, wherein the BWP i and the BWP j are different BWPs, and i and j are different integers.

The transmission and reception procedure of first data may be terminated at the BWP changing point, and soft bits for the first data stored in a buffer of the terminal or the base station may be deleted.

The operation method may further comprise, when the transmission and reception procedure of first data is suspended at the BWP changing point, and the transmission and reception procedure of second data is completed in the BWP j, changing the operation BWP from the BWP j to the BWP i; and resuming the suspended transmission and reception procedure of first data in the BWP i.

The BWP change information may be received through at least one of a radio resource control (RRC) message, a medium access control (MAC) control element (CE), and a downlink control channel.

The BWP change information may be received together with resource allocation information for the first data through a downlink control channel.

The BWP change information may include a BWP change notification indicating that a BWP change is requested, the BWP changing point, and information indicating a new BWP.

The BWP changing point may be one of a starting point of a slot, a starting point of a subframe, a starting point of a transmission time interval (TTI), an ending point of a guard period (GP), and a starting point of an uplink transmission period.

Each of the transmission and reception procedure of first data and the transmission and reception procedure of second data may be performed with the base station or another terminal.

In order to achieve the objective of the present disclosure, an operation method of a terminal in a communication system may comprise receiving first bandwidth part (BWP) change information from a base station in a BWP i; when a transmission and reception procedure of data in the BWP i is not completed at a first BWP changing point indicated by the first BWP change information, performing the transmission and reception procedure of data in the BWP i even after the first BWP changing point without changing an operation BWP of the terminal; and changing the operation BWP of the terminal from the BWP i to a BWP j when the transmission and reception procedure of data is completed in the BWP i, wherein the BWP i and the BWP j are different BWPs, and i and j are different integers.

The operation BWP may be changed from the BWP i to the BWP j after a preconfigured duration from completion of the transmission and reception procedure of data.

The operation BWP may be changed from the BWP i to the BWP j at a second BWP changing point indicated by second BWP change information received from the base station.

The first BWP change information may be received through at least one of a radio resource control (RRC) message, a medium access control (MAC) control element (CE), and a downlink control channel.

The first BWP change information may be received together with resource allocation information for the data through a downlink control channel.

The first BWP change information may include a BWP change notification indicating that a BWP change is requested, the first BWP changing point, and information indicating a new BWP.

The first BWP changing point may be one of a starting point of a slot, a starting point of a subframe, a starting point of a transmission time interval (TTI), an ending point of a guard period (GP), and a starting point of a data channel (e.g., starting point of transmission period for downlink data, starting point of transmission period for uplink data).

In order to achieve the objective of the present disclosure, an operation method of a terminal in a communication system may comprise receiving bandwidth part (BWP) change information from a base station in a BWP i; changing an operation BWP of the terminal from the BWP i to a BWP j even when a transmission and reception procedure of first data in the BWP i is not completed at a BWP changing point indicated by the BWP change information; performing the transmission and reception procedure of first data in the BWP j; and performing a transmission and reception procedure of second data in the BWP j when the transmission and reception procedure of first data is completed, wherein the BWP i and the BWP j are different BWPs, and i and j are different integers.

The BWP change information may be received through at least one of a radio resource control (RRC) message, a medium access control (MAC) control element (CE), and a downlink control channel.

The BWP change information may be received together with resource allocation information for the data through a downlink control channel.

The BWP change information may include a BWP change notification indicating that a BWP change is requested, the BWP changing point, and information indicating a new BWP.

The BWP changing point may be one of a starting point of a slot, a starting point of a subframe, a starting point of a transmission time interval (TTI), an ending point of a guard period (GP), and a starting point of an uplink transmission period.

According to the embodiments of the present disclosure, a BWP can be changed based on one or more preconfigured BWP changing methods (e.g., BWP switching methods). For example, even when a transmission or reception procedure of first data in the current operation BWP is not completed at the time of the BWP change, the communication node (e.g., base station and terminal) can change the operation BWP to a new BWP, and can perform a transmission or reception procedure of second data in the new BWP. In this case, the transmission latency of the second data in the new BWP can be prevented. In addition, when the transmission or reception procedure of the second data is completed in the new BWP, the communication node can change the operation BWP to the previously operated BWP, and perform the suspended transmission or reception procedure of the first data in the previously operated BWP. In this case, the transmission reliability of the first data can be improved.

Alternatively, even when the transmission or reception procedure of the first data in the current operation BWP is not completed at the time of the BWP change, the communication node (e.g., base station and terminal) can change the operation BWP to the new BWP, perform the transmission or reception procedure of the first data preferentially in the new BWP, and perform the transmission or reception procedure of the second data in the new BWP after the transmission or reception procedure of the first data is completed. In this case, the transmission reliability of the first data can be improved.

Alternatively, when a transmission or reception procedure of data in the current operation BWP is not completed at the time of the BWP change, the communication node can perform the transmission or reception procedure of the data in the current operation BWP without changing the BWP, and change the operation BWP to the new BWP after completion of the transmission or reception procedure of the data in the current operation BWP. In this case, the transmission reliability of the data can be improved.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
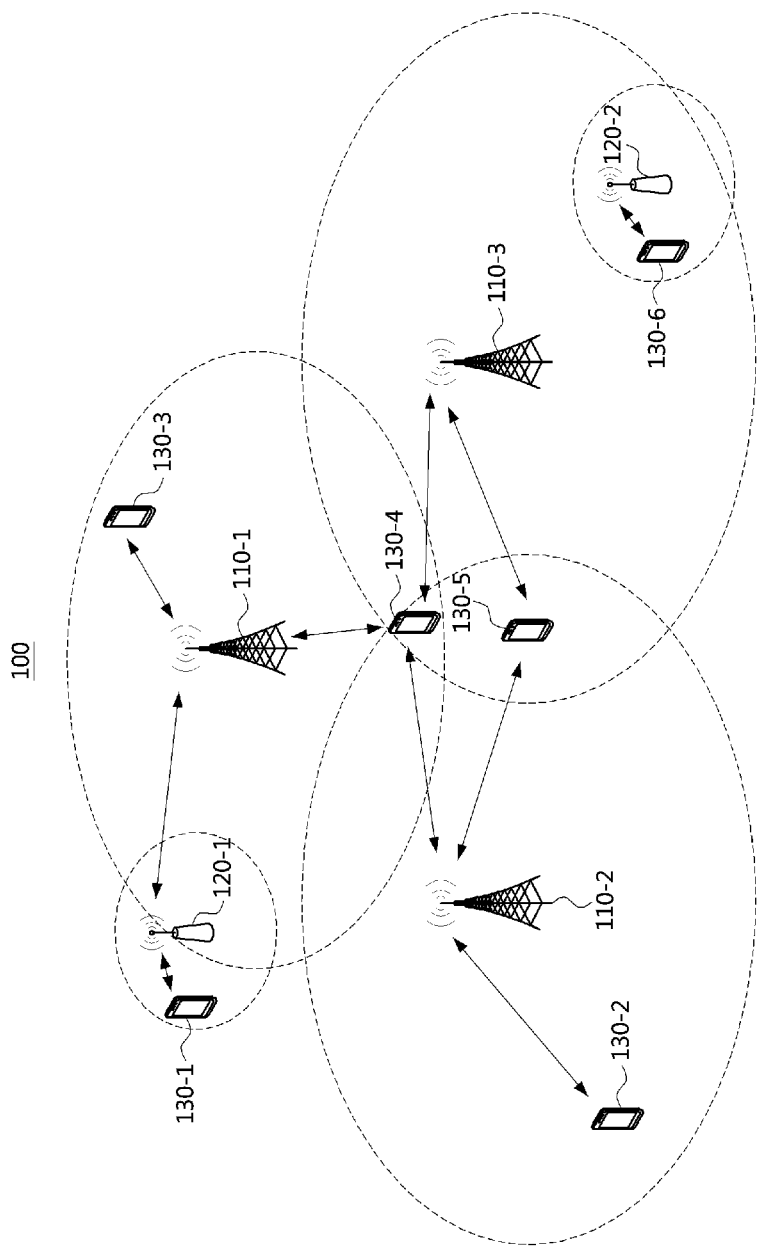
FIG. 1 is a conceptual diagram showing a first embodiment of a communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, wireless communication networks to which exemplary embodiments according to the present disclosure will be described. However, wireless communication networks to which exemplary embodiments according to the present disclosure are applied are not restricted to what will be described below. That is, exemplary embodiments according to the present disclosure may be applied to various wireless communication networks. Here, a communication system may be used in the same sense as a communication network.

FIG. 1 is a conceptual diagram showing a first embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support the 4G communication (e.g., LTE, LTE-Advanced (LTE-A), etc.), the 5G communication (e.g., NR), or the like specified by the $3^{rd}$ generation partnership project (3GPP) standards. The 4G communication may be performed in a frequency band below 6 GHz, and the 5G communication may be performed in a frequency band above 6 GHz as well as the frequency band below 6 GHz.

For example, for the 4G and 5G communications, the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix (CP)-OFDM based communication protocol, a discrete Fourier transform-spread-OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may include a serving gateway (S-GW), a packet data network (PDN) gateway (P-GW), a mobility management entity (MME), and the like. When the communication system 100 supports the 5G communication, the core network may include a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 may have the following structure.

Figure 2:
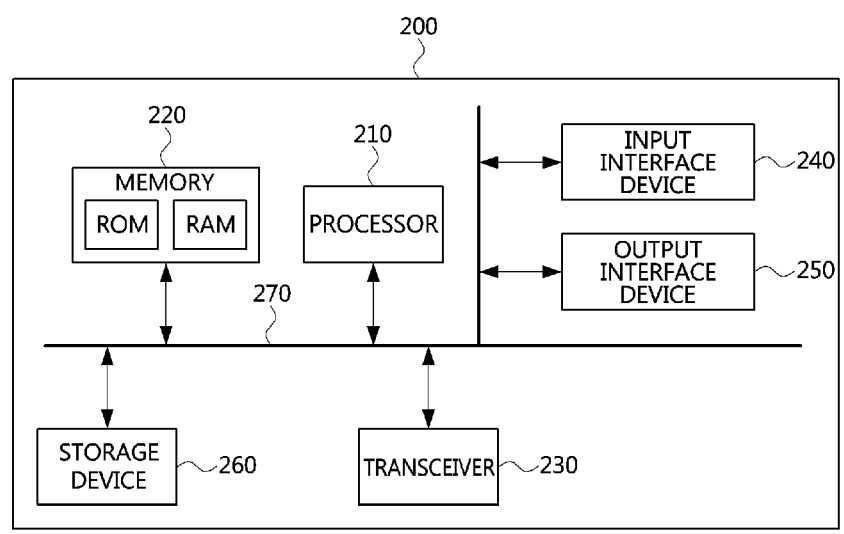
FIG. 2 is a block diagram showing a first embodiment of a communication node constituting a communication system.

FIG. 2 is a block diagram showing a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, an evolved Node-B (eNB), a gNB, a base transceiver station (BTS), a radio base station, a radio transceiver, an access point, an access node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or the non-ideal backhaul link. Also, each of the plurality of base stations 110-1, 110-2, 110-3, 120-1, and 120-2 may be connected to the core network through the ideal or the non-ideal backhaul link. Each of the plurality of base stations 110-1, 110-2, 110-3, 120-1, and 120-2 may transmit a signal received from the core network to the corresponding terminal(s) 130-1, 130-2, 130-3, 130-4, 130-5, or 130-6, and transmit a signal received from the corresponding terminal(s) 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Next, methods for reducing transmission latencies in a communication system will be described. Even when a method (e.g., transmission or reception of a signal) to be performed at a first communication node among the communication nodes is described, the corresponding second communication node may perform a method (e.g., reception or transmission of a signal) corresponding to the method performed at the first communication node. That is, when the operation of the terminal is described, the corresponding base station may perform an operation corresponding to the operation of the terminal. Conversely, when the operation of the base station is described, the corresponding terminal may perform an operation corresponding to the operation of the base station.

A communication node providing enhanced services in the following embodiments may be an enhanced mobile broadband (eMBB) device (e.g., a communication node that transmits and receives high capacity data), a low-latency enabled (LL) device (e.g., a communication node that supports a transmission latency reduction function), a coverage enhanced (CE) device (e.g., a communication node that supports an extended coverage providing function), or a low complexity (LC) device (e.g., a communication node that supports enhanced complexity).

The eMBB device, the LL device, the CE device, and the LC device may be a device for providing enhanced services and reliability. The device for providing enhanced services and reliability may be a base station, a relay, or a terminal. Also, the device for providing enhanced services and reliability may be mounted on a vehicle, a train, an unmanned aerial vehicle (e.g., drone), a manned aircraft, or the like. A communication node that provides reliability in addition to the eMBB device, the LL device, the CE device, and the LC device may perform the following embodiments.

The device for providing enhanced services and reliability may operate as a transmitting device, a receiving device, or a relay device. In a downlink communication procedure, a base station may operate as a transmitting device, and a terminal may operate as a receiving device. In an uplink communication procedure, the base station may operate as a receiving device, and the terminal may operate as a transmitting device.

Meanwhile, in a communication system that provides a high-capacity data service (e.g., eMBB service), a high-quality voice call service, a high-quality video call service, an accurate/quick data sharing service in a dense living space, and a high-speed data (e.g., video data) service may be provided.

In addition, the communication system may provide a real-time interaction based convergence service (e.g., low latency services or ultra-low latency services). For example, the real-time interaction based convergence service may include a vehicle-to-everything (V2X) communication service, a drone communication service, a remote medical service, an industrial Internet of Things (IoT) service, an augmented reality (AR) service, and a virtual reality (VR) service. The low-latency services may be performed as follows.

Figure 3:
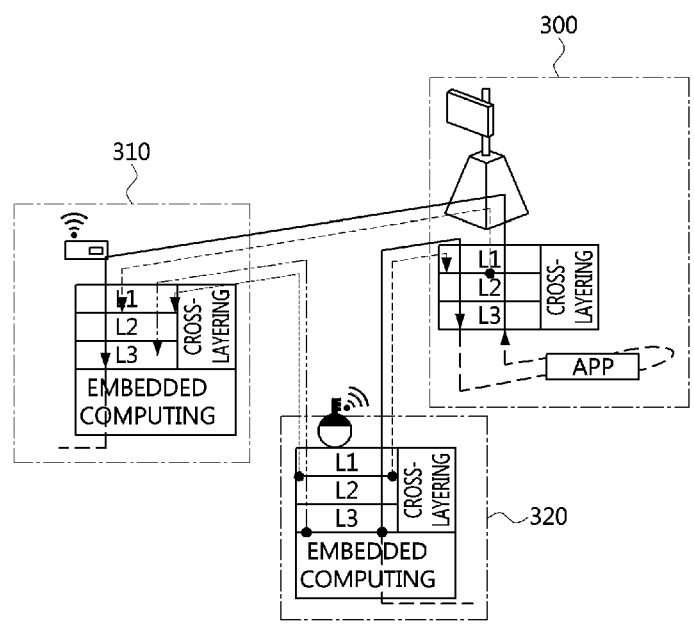
FIG. 3 is a conceptual diagram showing a first embodiment of a communication system supporting low-latency services.

FIG. 3 is a conceptual diagram showing a first embodiment of a communication system supporting low-latency services.

Referring to FIG. 3, a communication system may comprise a base station 300, a first terminal 310, and a second terminal 320. The first terminal 310 may be an actuator and the second terminal 320 may be a sensor node or a utility node. The base station 300 may include a layer 1 (L1), a layer 2 (L2), a layer 3 (L3), and an application layer (APP). The base station 300 may be connected to a mobile edge cloud (MEC) server. Cross-layering may be applied to the layers included in the base station 300. Each of the first terminal 310 and the second terminal 320 may include a layer 1 (L1), a layer 2 (L2), and a layer 3 (L3). Also, each of the first terminal 310 and the second terminal 320 may further include a layer that performs an embedded computing function. Cross-layering may be applied to the layers included in each of the first terminal 310 and the second terminal 320.

A radio transmission latency may be classified into a direct radio transmission latency and an indirect radio transmission latency. In order to support a high transmission rate, a high transmission efficiency, a short transmission latency, and a robust data transmission in communication between communication nodes (e.g., the base station 300, the first terminal 310, and the second terminal 320), a strict time latency may be required.

In the communication system that provides ultra-low-latency services, the radio transmission latency may include a transmission processing latency, a radio link latency, and a reception processing latency. The transmission processing latency may include a transmission latency (e.g., L2 processing latency) from the application layer (APP) to the layer 1 (L1) and an L1 processing latency. The reception processing latency may include an L1 processing latency and a transmission latency from the layer 1 (L1) to the application layer (APP) (e.g., L2 processing latency). The L1 processing latency may be determined based on a processing performance of a baseband and a processing performance of a radio frequency (RF).

Figure 4:
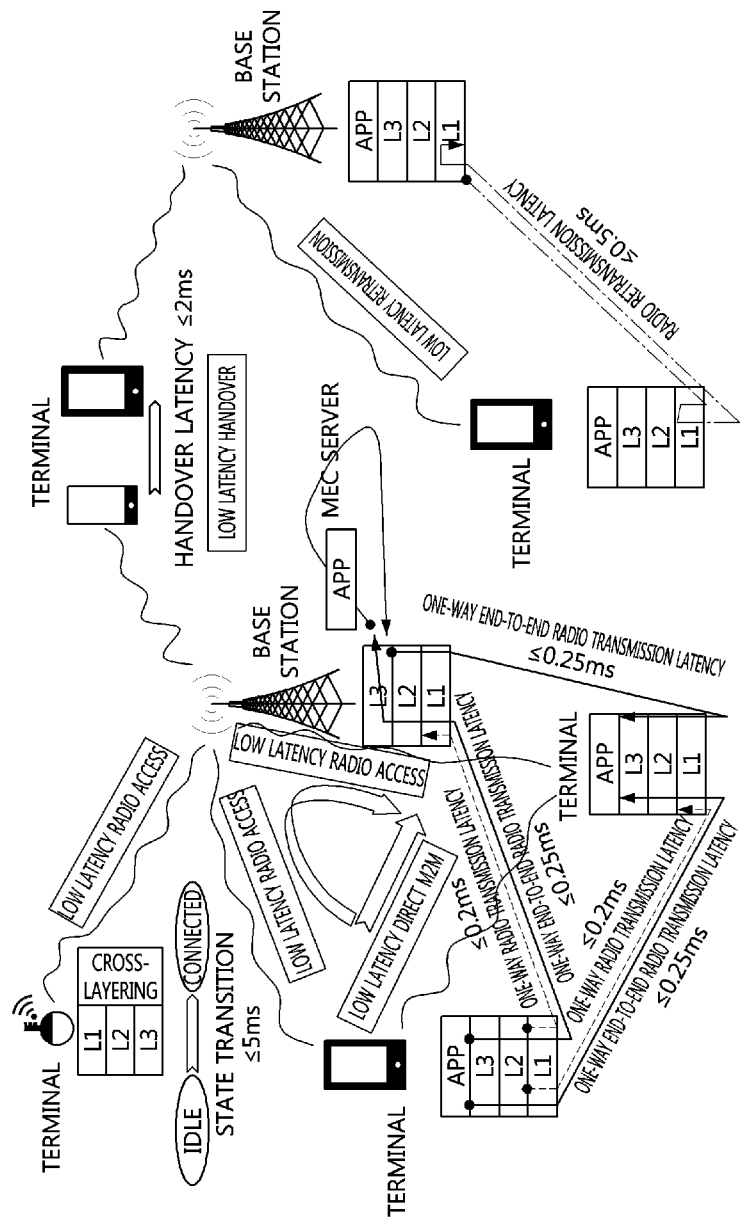
FIG. 4 is a conceptual diagram showing a first embodiment of a communication system supporting ultra-low-latency services.

FIG. 4 is a conceptual diagram showing a first embodiment of a communication system supporting ultra-low-latency services.

Referring to FIG. 4, a communication system may comprise a base station and a terminal. The base station may include a layer 1 (L1), a layer 2 (L2), a layer 3 (L3), and an application layer (APP). The base station may be connected to an MEC server. The terminal may include a layer 1 (L1), a layer 2 (L2), and a layer 3 (L3). Also, the terminal may further include an application layer (APP). Cross-layering may be applied to the layers included in the terminal.

For example, requirement for a one-way radio transmission latency between communication nodes (e.g., base station and terminal) may be within 0.2 ms, and requirement for a one-way end-to-end radio transmission latency between communication nodes may be within 0.25 ms. Also, requirement of a radio retransmission latency between communication nodes may be within 0.5 ms, and requirement of a handover latency may be within 2 ms.

The one-way radio transmission latency, the one-way end-to-end radio transmission latency, and the radio retransmission latency may be defined according to a start time and an end time of the signal processing.

One-way radio transmission latency: The one-way radio transmission latency may be a time from when data is received from a layer 2 (L2) at a transmitting end to when the data is transferred to a layer 2 (L2) at a receiving end. For example, the one-way radio transmission latency may include a layer 1 (L1) processing time (e.g., modulation processing time, encoding processing time) at the transmitting end, a transmission time through a radio link, and a layer (L1) processing time (e.g., demodulation processing time, decoding processing time) at the receiving end.

One-way end-to-end radio transmission latency: The one-way end-to-end radio transmission latency may be a time from when data is received from an application layer (APP) at a transmitting end to when the data is transferred to an application layer (APP) at a receiving end. For example, the one-way end-to-end radio transmission latency may include a layer 2/3 (L2/3) processing time (e.g., generation time of a data header) at the transmitting end, the layer 1 (L1) processing time at the transmitting end, the transmission time through a radio link, the layer 1 (L1) processing time at the receiving end, and a layer 2/3 (L2/3) processing time at the receiving end.

Radio retransmission latency: The radio retransmission latency may be a time from when data is transmitted from the layer 1 (L1) at the transmitting end to when a preparation of a retransmission based on a feedback signal (e.g., acknowledgment (ACK) or a negative ACK (HACK)) for the data is completed. For example, the radio retransmission latency may include the transmission time of the data through a radio link, the processing time of the data in the layer 1 (L1) at the receiving end, a transmission time of the feedback signal through the radio link, and a processing time of the feedback signal in the layer 1 at the transmitting end.

In order to provide ultra-low-latency services to the terminal in the communication system, a radio access latency and a handover service latency may be defined.

Radio access latency: In order to reduce battery consumption of a terminal, an operation state of the terminal may be defined as an inactive state or an active state, and the radio access latency may be a time required for the operation state of the terminal to transit from the inactive state to the active state. The inactive state may be referred to as an idle state, and the active state may be referred to as a connected state.

Handover service latency: The handover service latency may be a time (e.g., mobility interruption time (MIT)) during which data transmission and reception are suspended during a handover procedure.

Meanwhile, the radio transmission latency may be classified into a downlink transmission latency and an uplink transmission latency. The downlink transmission latency may be as follows.

Figure 5:
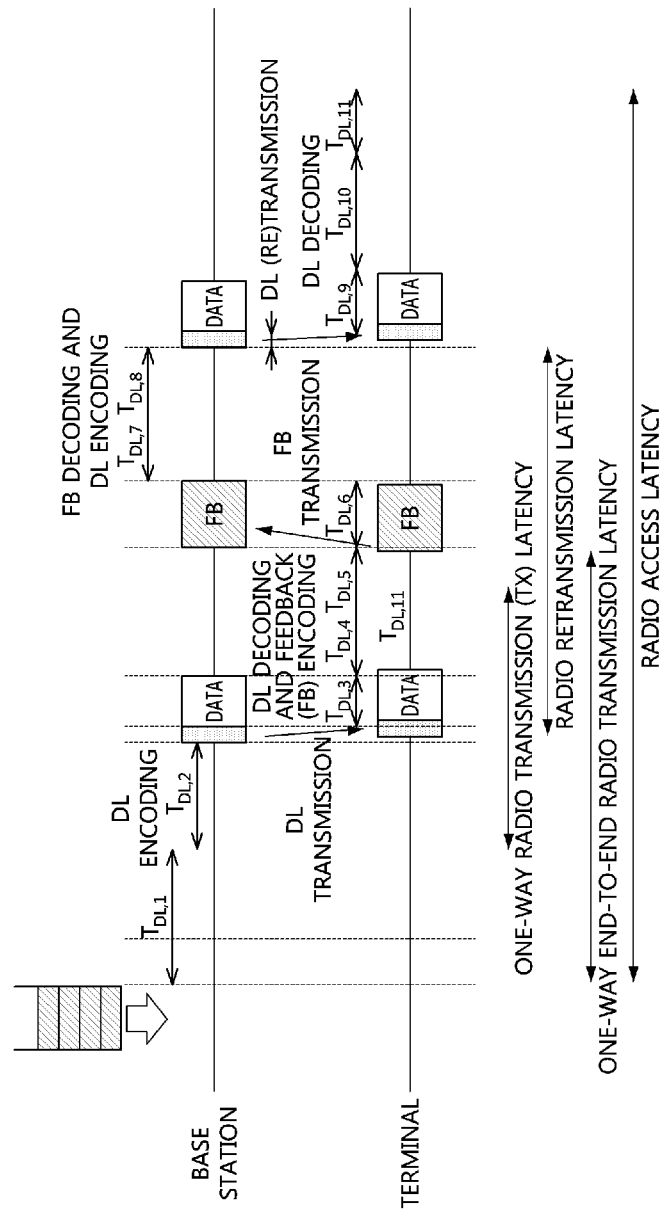
FIG. 5 is a conceptual diagram showing a first embodiment of a downlink transmission latency in a communication system.

FIG. 5 is a conceptual diagram showing a first embodiment of a downlink transmission latency in a communication system.

Referring to FIG. 5, a downlink transmission latency may be classified into a one-way radio transmission (TX) latency, a radio retransmission latency, a one-way end-to-end radio transmission latency, and a radio access latency. $T_{DL,1}$ to $T_{DL,11}$ may be defined as shown in Table 1 below. Table 1 shows mapping relationship between the functional elements and the latencies in the downlink transmission. The 'end-to-end' in Table 1 may indicate the one-way end-to-end radio transmission latency of FIG. 5, the 'one-way' in Table 1 may indicate the one-way radio transmission latency of FIG. 5. The 'retransmission' in Table 1 may indicate the radio retransmission latency of FIG. 5, and the 'access' in Table 1 may indicate the radio access latency of FIG. 5.

TABLE 1

|  | Description | Base station | terminal | End-to-end | One-way | retransmission | access |
|---|---|---|---|---|---|---|---|
| $T_{DL,1}$ | L2/L3 processing latency for incoming data | X |  | X |  |  | X |
| $T_{DL,2}$ | L1 processing latency for DL encoding (including TTI alignment) | X |  | X | X |  | X |
| $T_{DL,3}$ | Time for transmission of DL data | X |  | X | X | X | X |

TABLE 1-continued

| | Description | Base station | terminal | End-to-end | One-way | retransmission | access |
|---|---|---|---|---|---|---|---|
| $T_{DL,4}$ | L1 processing latency for DL decoding | | X | X | X | X | X |
| $T_{DL,5}$ | L1 processing latency for HARQ ACK/NACK encoding | | X | | | X | X |
| $T_{DL,6}$ | Feedback time | | X | | | X | X |
| $T_{DL,7}$ | L1 processing latency for feedback decoding | X | | | | X | X |
| $T_{DL,8}$ | L1 processing latency for DL encoding | X | | | | X | X |
| $T_{DL,9}$ | Time for retransmission of DL data | X | | | | | X |
| $T_{DL,10}$ | L1 processing latency for DL data decoding | | X | | | | X |
| $T_{DL,11}$ | L2/L3 processing latency for outgoing data | X | | X | | | X |

Meanwhile, the uplink transmission latency may be as follows.

Figure 6:
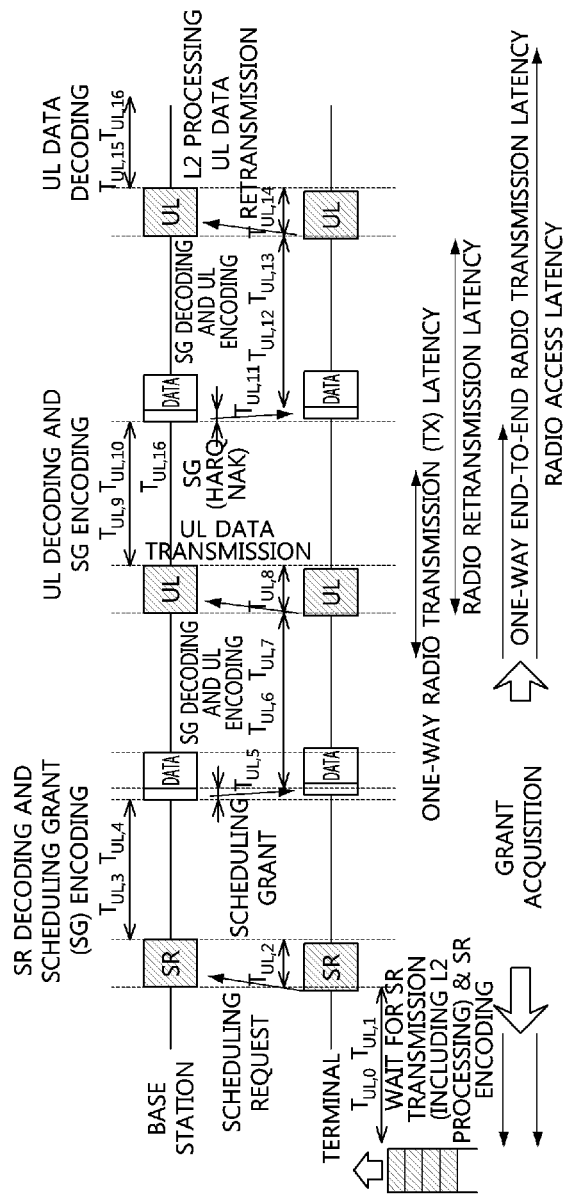
FIG. 6 is a conceptual diagram showing a first embodiment of an uplink transmission latency in a communication system.

FIG. 6 is a conceptual diagram showing a first embodiment of an uplink transmission latency in a communication system.

Referring to FIG. 6, the uplink transmission latency may be classified into a one-way radio transmission (TX) latency, a radio retransmission latency, a one-way end-to-end radio transmission latency, and a radio access latency. $T_{UL,0}$ to $T_{UL,16}$ may be defined as shown in Table 2 below. Table 2 shows mapping relationship between the functional elements and the latencies in the downlink transmission. The 'end-to-end' in Table 2 may indicate the one-way end-to-end radio transmission latency of FIG. 6, the 'one-way' in Table 2 may indicate the one-way radio transmission latency of FIG. 6. The 'retransmission' in Table 2 may indicate the radio retransmission latency of FIG. 6, and the 'access' in Table 2 may indicate the radio access latency of FIG. 6.

TABLE 2

| | Description | Base station | terminal | End-to-end | One-way | retransmission | access |
|---|---|---|---|---|---|---|---|
| $T_{UL,0}$ | Average wait time for scheduling request (SR) (including L2/L3 processing latency for incoming data) | | X | X | | | X |
| $T_{UL,1}$ | L1 processing latency for scheduling grant (SG) decoding | | X | X | | | X |
| $T_{UL,2}$ | Time for transmission of SR | | X | X | | | X |
| $T_{UL,3}$ | L1 processing latency for SR decoding | X | | X | | | X |
| $T_{UL,4}$ | L1 processing latency for SG encoding | X | | X | | | X |
| $T_{UL,5}$ | Time for transmission of SG | X | | X | | | X |
| $T_{UL,6}$ | Processing latency for SG decoding | | X | X | | | X |
| $T_{UL,7}$ | L1 processing latency for UL data encoding | | X | X | X | | X |
| $T_{UL,8}$ | Time for transmission of UL data | | X | X | X | X | X |
| $T_{UL,9}$ | L1 processing latency for UL decoding | X | | X | X | X | X |
| $T_{UL,10}$ | L1 processing latency for SG encoding | X | | | | X | X |

TABLE 2-continued

| | Description | Base station | terminal | End-to-end | One way | retransmission | access |
|---|---|---|---|---|---|---|---|
| $T_{UL,11}$ | Time for transmission of SG | X | | | | X | X |
| $T_{UL,12}$ | L1 processing latency for SG decoding | | X | | | X | X |
| $T_{UL,13}$ | L1 processing latency for UL data encoding | | X | | | X | X |
| $T_{UL,14}$ | Time for transmission of UL data | | X | | | | X |
| $T_{UL,15}$ | L1 processing latency for UL data decoding | X | | | | | X |
| $T_{UL,16}$ | L2 processing latency for outgoing data | X | X | | | | X |

Figure 7:
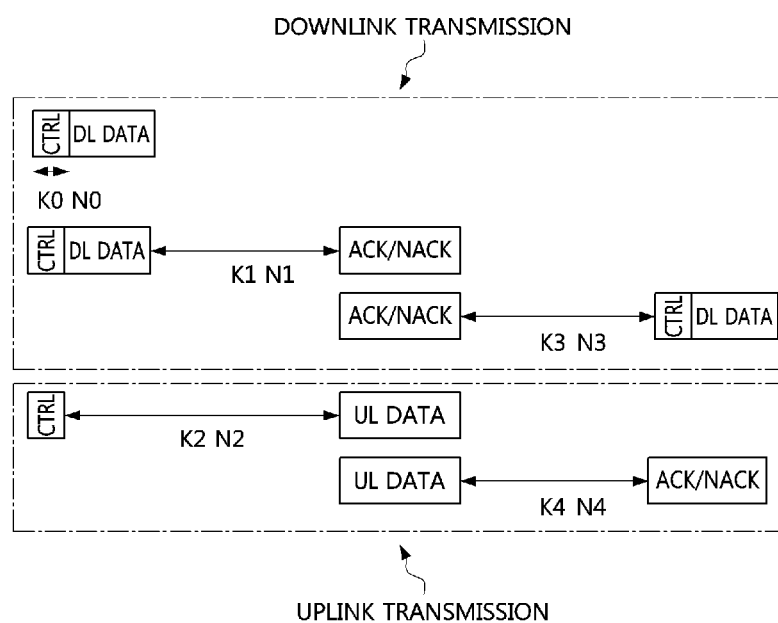
FIG. 7 is a conceptual diagram showing latencies in downlink and uplink transmissions in a communication system.

FIG. 7 is a conceptual diagram showing latencies in downlink and uplink transmissions in a communication system.

Referring to FIG. 7, a base station may transmit a control channel (CTRL) including a downlink (DL) grant to a terminal, and transmit a data channel including downlink data scheduled by the DL grant to the terminal. The terminal may receive the control channel (CTRL) from the base station, and identify the DL grant included in the control channel (CTRL). The terminal may receive the data channel by monitoring time-frequency resources indicated by the DL grant, and obtain the downlink data included in the data channel. However, when the downlink data is not successfully decoded, the terminal may transmit a NACK to the base station in response to the downlink data. When the NACK is received from the terminal, the base station may retransmit the downlink data.

In the uplink transmission, the base station may transmit a control channel (CTRL) including an uplink (UL) grant to the terminal. The terminal may receive the control channel (CTRL) from the base station, and identify the UL grant included in the control channel (CTRL). The terminal may transmit a data channel including uplink data to the base station through time-frequency resources indicated by the UL grant. The base station may receive the data channel by monitoring time-frequency resources indicated by the UL grant, and obtain the uplink data included in the data channel. The base station may transmit a feedback signal (e.g., ACK or NACK) to the terminal according to the result of decoding the uplink data.

In FIG. 7, the meaning of K0 to K4 and N0 to N4 may be as shown in Table 3 below. In Table 3 below, a latency unit of K0 to K4 may be a TTI, and a latency unit of N0 to N4 may be a symbol.

TABLE 3

| latency | Definition |
|---|---|
| K0 | Reception latency of DL grant and the corresponding DL Data (PDSCH) (latency in units of TTIs) |
| K1 | Reception latency of DL data (PDSCH) and transmission latency of the corresponding ACK/NACK (latency in units of TTIs) |
| K2 | Reception latency of UL grant and transmission latency of UL data (PUSCH) (latency in units of TTIs) |
| K3 | Reception latency of ACK/NACK and retransmission latency of the corresponding DL data (PDSCH) (latency in units of TTIs) |

TABLE 3-continued

| latency | Definition |
|---|---|
| K4 | Transmission latency of UL data (PUSCH) and reception latency of the corresponding ACK/NACK (latency in units of TTIs) |
| N0 | The number of symbols from the end of DL grant transmission to the transmission start time of the corresponding PDSCH. That is, the number of symbols is the time required for processing at the base station. The number of symbols from the end of DL grant reception to the reception start time of the corresponding PDSCH. That is, the number of symbols is the time required for processing at the terminal. |
| N1 | The number of symbols from the end of PDSCH reception to the transmission start time of the corresponding ACK/NACK. That is, the number of symbols is the time required for processing at the terminal. |
| N2 | The number of symbols from the end of reception of PDSCH containing UL grant to the transmission start time of the corresponding PUSCH. That is, the number of symbols is the time required for processing at the terminal. |
| N3 | The number of symbols from the end of ACK/NACK reception to the retransmission start time of the corresponding PDSCH. That is, the number of symbols is the time required for processing at the base station. |
| N4 | The number of symbols from the end of PUSCH reception to the transmission start time of the corresponding ACK/NACK. That is, the number of symbols is the time required for processing at the base station. The number of symbols from the end of PUSCH transmission to the reception start time of the corresponding ACK/NACK. That is, the number of symbols is the time required for processing at the terminal. |

1. Methods for Reducing Transmission Latency Due to a Bandwidth Adaptation and Methods for Improving a Transmission Rate The bandwidth part (BWP) may indicate some bandwidth in a system bandwidth operated by a cell. Also, a bandwidth adaptation may mean adjusting and varying a location and a size of an operation bandwidth for data transmission and reception through a change of operational parameters (e.g., numerology). The bandwidth adaptation may be performed as follows.

Figure 8:
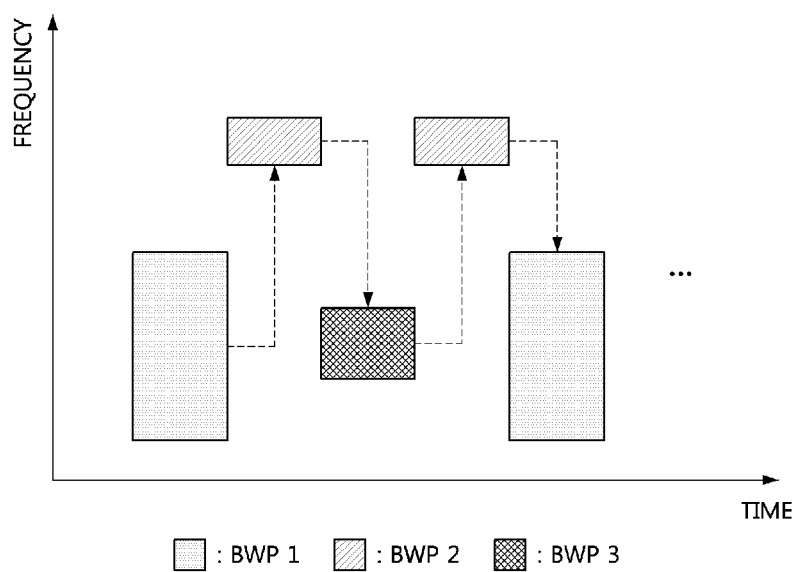
FIG. 8 is a conceptual diagram illustrating a BWP according to a bandwidth adaptation in a communication system.

FIG. 8 is a conceptual diagram illustrating a BWP according to a bandwidth adaptation in a communication system.

Referring to FIG. 8, an operation bandwidth may be changed or switched as 'BWP 1→BWP 2→BWP 3→BWP 2→BWP 1' according to a bandwidth adaptation. For example, the size of BWP 1 in the frequency axis may be 40 MHz, and the BWP 1 may be configured according to a subcarrier spacing of 15 kHz. The size of BWP 2 in the frequency axis may be 10 MHz, and the BWP 2 may be configured according to a subcarrier spacing of 15 kHz, and the size of BWP 3 in the frequency axis may be 20 MHz, and the BWP 3 may be configured according to a subcarrier spacing of 60 kHz.

The bandwidth adaptation may be useful for reducing power consumption or bandwidth for intermittent services, changing a center frequency for flexible scheduling, and changing the subcarrier spacing for low latency services.

The base station may transmit BWP configuration information to the terminal by using at least one of a radio resource control (RRC) message (e.g., an RRC configuration message, an RRC control message), a medium access control (MAC) control element (CE), and a downlink control information (DCI) included in a physical downlink control channel (PDCCH). The terminal may receive the BWP configuration information from the base station, and may communicate with the base station in a BWP indicated by the BWP configuration information.

The BWP configuration information may include at least one of an operation parameter (e.g., identifier (or index to identify) of an operated BWP, information indicating a position of an operation bandwidth, information indicating the size of the operation bandwidth, a subcarrier spacing, a cyclic prefix (CP), and a numerology applied to the operation bandwidth), a transmission time point and a feedback time point for (re)transmission of data, a reception time point of a downlink control channel, information on a time during which a current BWP is applied (e.g., timing, frame duration), configuration information of a new BWP (e.g., a next BWP), and a time period for which the new BWP is applied (e.g., timing, frame duration), and the like.

The BWP change or switch (e.g., BWP change or switch for data (re)transmission) may be performed at a time point indicated by information elements (e.g., change or switch time, the new BWP index) included in the BWP configuration information. Alternatively, the BWP change or switch may be performed after a preconfigured duration (e.g., n slots or subframes) from the reception time of the BWP configuration information. Here, n may be an integer equal to or greater than 0. The 'BWP change' may be also referred to as a 'BWP switching.'

In addition, the terminal may change the BWP based on a preconfigured BWP change pattern. For example, after the terminal changes the operation BWP from BWP 1 to BWP 2 according to the BWP change pattern, the terminal may transmit or receive data to or from the base station in the BWP 2, and after the terminal changes the operation BWP from BWP 2 to BWP 3 according to the BWP change pattern, the terminal may transmit or receive data to or from the base station in the BWP 3. The BWP change pattern may be included in the BWP configuration information.

Meanwhile, a plurality of BWP configuration information and corresponding BWP change (e.g., BWP change pattern) can be configured between a BS and a terminal. Moreover, if the terminal receives the BWP change information (i.e., BWP change pattern) from the BS, the terminal may override the BWP change information. That is, the terminal may use the new BWP change information instead of the prior BWP change information. Also, the terminal may perform the operation related to the BWP change based on the information indicated by the recently BWP change information.

On the other hand, when the BWP change time overlaps with a transmission time point of a signal (e.g., synchronization signal, reference signal, feedback of data transmission, retransmission data) transmitted in accordance with a preconfigured period or a preconfigured timing, the terminal may not receive the corresponding signal successfully. Thus, BWP changing methods for solving such the problem are needed.

For example, when the base station transmits a synchronization signal in BWP 3, the terminal is required to receive the synchronization signal in BWP 3 to acquire or maintain synchronization with the base station. Even when the terminal receives data in BWP 2, the terminal may be required to change the operation BWP from BWP 2 to BWP 3 before reception of the synchronization signal in order to receive the synchronization signal. However, if a retransmission procedure of data is not completed in BWP 2 before the reception of the synchronous signal due to retransmission of the data, and the operation BWP is changed from BWP 2 to BWP 3, the terminal may not be able to receive the data successfully. Thus, BWP changing methods for solving such the problem are needed.

1.1 BWP Changing Methods for Data (Re)Transmission

One or more combinations of BWP changing methods 1 to 4 to be described below may be used for the BWP change. For example, the BWP changing method may vary depending on a specific BWP, a specific terminal, a specific service, and a specific requirement. The base station may transmit information indicating one or more BWP changing methods supported by the base station among the BWP changing methods 1 to 4 to the terminal through at least one of an RRC message, a MAC CE, and a downlink control channel. The terminal may receive the information indicating one or more BWP changing methods supported by the base station from the base station, and may perform communication (e.g., downlink communication, uplink communication, sidelink communication, unlicensed band communication) using the one or more BWP changing methods supported by the base station.

1.1.1 BWP Changing Method 1

A communication procedure may be terminated at the time of BWP change regardless of whether transmission or reception of data is completed or not. The communication node (e.g., the base station and the terminal) may change the current operation BWP to the new BWP at the time of BWP change, and may perform transmission or reception of new data in the new operating BWP. That is, even when the transmission or reception of data is not completed, the communication node may not expect the data to be (re)transmitted, and may not perform the operation related to data transmission and reception (e.g., a buffering operation on the data received) in the previously operated BWP.

Figure 9A:
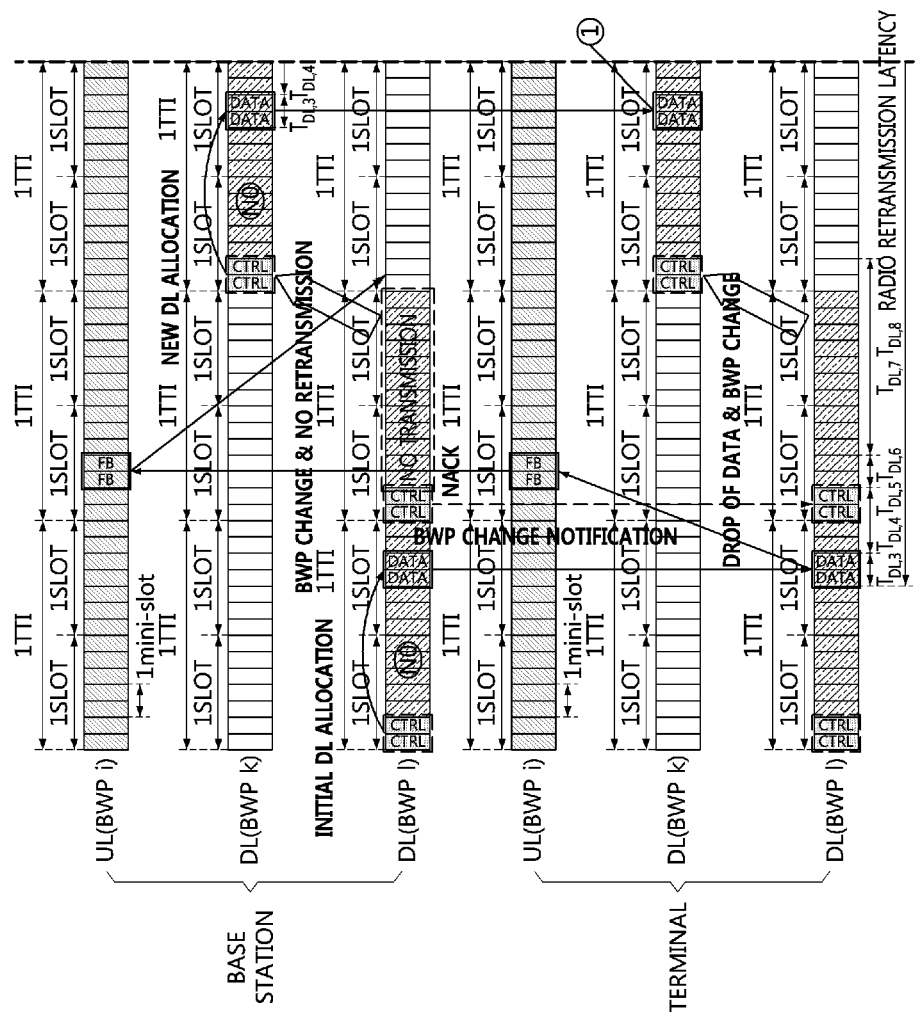
FIGS. 9A and 9B are conceptual diagrams illustrating a first embodiment of a downlink communication procedure according to a BWP changing method 1 in an FDD communication system.
Figure 9B:
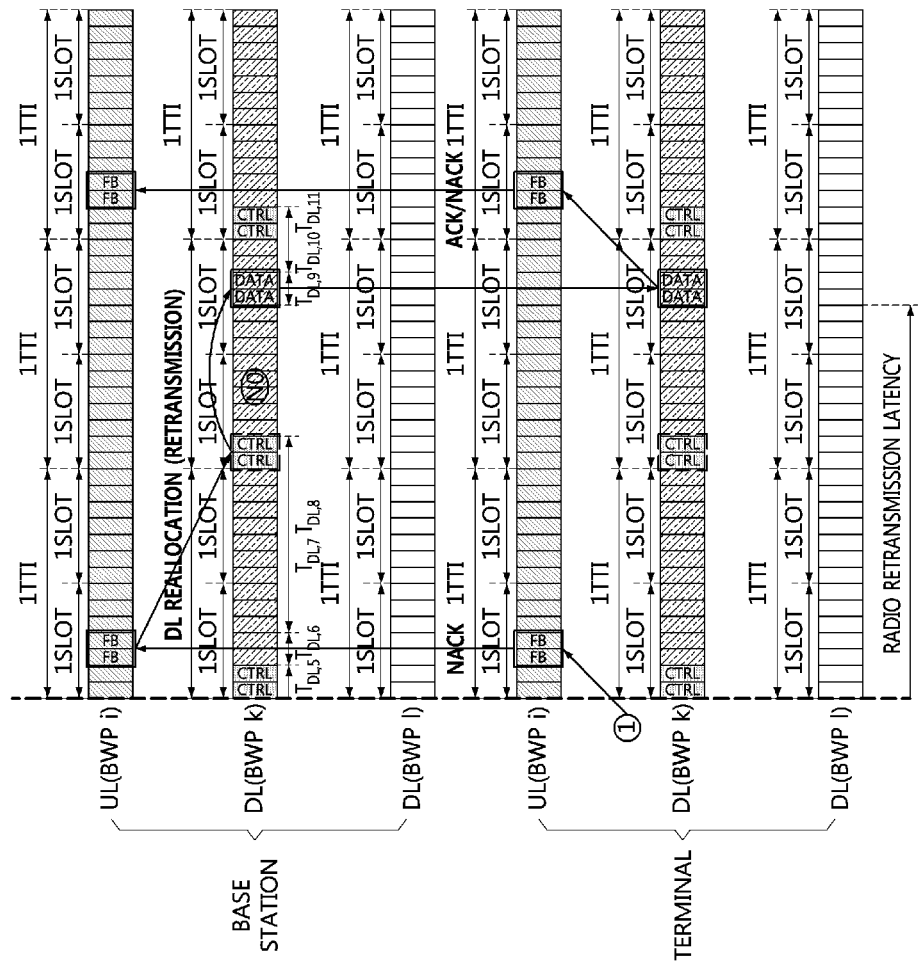

FIGS. 9A and 9B are conceptual diagrams illustrating a first embodiment of a downlink communication procedure according to a BWP changing method 1 in a frequency division duplex (FDD) communication system.

Referring to FIGS. 9A and 9B, BWP i may be a UL BWP, and BWPs k and 1 may be DL BWPs. Each of BWPs i, k, and 1 may be a different BWP. In the time axis, the last slots shown in FIG. 9A may be contiguous with the starting slots shown in FIG. 9B. That is, the HARQ response of the DATA indicated by ① in FIG. 9A may be the FB indicated by ① in FIG. 9B. $T_{DL,3}$, $T_{DL,4}$, $T_{DL,5}$, $T_{DL,6}$, $T_{DL,7}$, $T_{DL,8}$, $T_{DL,9}$, $T_{DL,10}$ and $T_{DL,11}$ may correspond to $T_{DL,3}$, $T_{DL,4}$, $T_{DL,5}$, $T_{DL,6}$, $T_{DL,7}$, $T_{DL,8}$, $T_{DL,9}$, $T_{DL,10}$ and $T_{DL,11}$ in FIG. 5, respectively. The base station and the terminal may perform downlink communication in BWP 1. When a BWP change from BWP 1 to BWP k is required, the base station may transmit BWP change information indicating the change from BWP 1 to BWP k through at least one of an RRC message, a MAC CE, and a downlink control channel. For example, the BWP change information may be included in a DCI format 1_1.

The BWP change information may include one or more parameter(s) among information for requesting the BWP change (hereinafter referred to as a 'BWP change notification'), information indicating a change time point of BWP (hereinafter referred to as a 'BWP changing point'), and information indicating a new BWP (e.g., BWP identifier (ID), BWP index, bitmap, BWP change pattern). The BWP changing point may be set to a starting point of a first slot, a starting point of a first subframe, a starting point of a first transmission time interval (TTI), an ending point of a guard period (GP), a starting point of an uplink transmission period, or a transmission time point of another downlink control channel after transmission of the downlink control channel (e.g., DCI).

The terminal may receive the BWP change information from the base station by monitoring the downlink control channel, and may identify that the change of the operation BWP (e.g., change from BWP 1 to BWP k) is requested based on the BWP change information. Also, the terminal may identify the BWP changing point based on the BWP change information. When the BWP change information is received, the terminal may transmit a response (e.g., ACK or NACK) for the BWP change information to the base station. When the positive response (i.e., ACK) for the BWP change information is received from the terminal, the base station may determine that the BWP change information is successfully received at the terminal. When the base station does not receive the positive response (i.e., ACK), receives the negative response (i.e., NACK), or does not receive the response for the BWP change information from the terminal within a predetermined time, the base station may assume that the BWP change information is not received at the terminal. In this case, the base station may request the BWP change by retransmitting the BWP change information or transmitting new BWP change information to the terminal. Meanwhile, when a plurality of BWP change information is received, the terminal may change the BWP based on the information indicated by the latest BWP change information.

The base station and the terminal may change the operation BWP at the time point configured by the base station or at a preconfigured time. For example, when the communication node changes the operation BWP from BWP 1 to BWP k, the base station and the terminal may terminate the downlink communication procedure from the transmission and reception of the BWP change information until the BWP changing point, and may perform a new downlink communication procedure in BWP k after the operation BWP is changed from BWP1 to BWP k.

The terminal may change the operation BWP from BWP 1 to BWP k even when the data transmission and reception procedure in BWP 1 is not completed. For example, even when a negative ACK (NACK) for downlink data is transmitted in BWP 1 to the base station, the terminal may not expect the downlink data to be retransmitted in BWP1, and may change the operation BWP from BWP 1 to BWP k. Also, since the terminal does not expect the downlink data to be retransmitted in BWP 1, the terminal may stop the operation related to data transmission and reception (e.g., a buffering operation) for downlink data. In this case, the terminal may drop data (e.g., soft bits, log likelihood ratio (LLR) values) stored in a soft buffer and information (e.g., HARQ process ID, redundancy version (RV), new data indicator (NDI)) for receiving the corresponding data. The base station may terminate the transmission of the corresponding data and drop the retransmission data stored in the soft buffer and information (e.g., HARQ process ID, RV, NDI) for the retransmission data.

Figure 10:
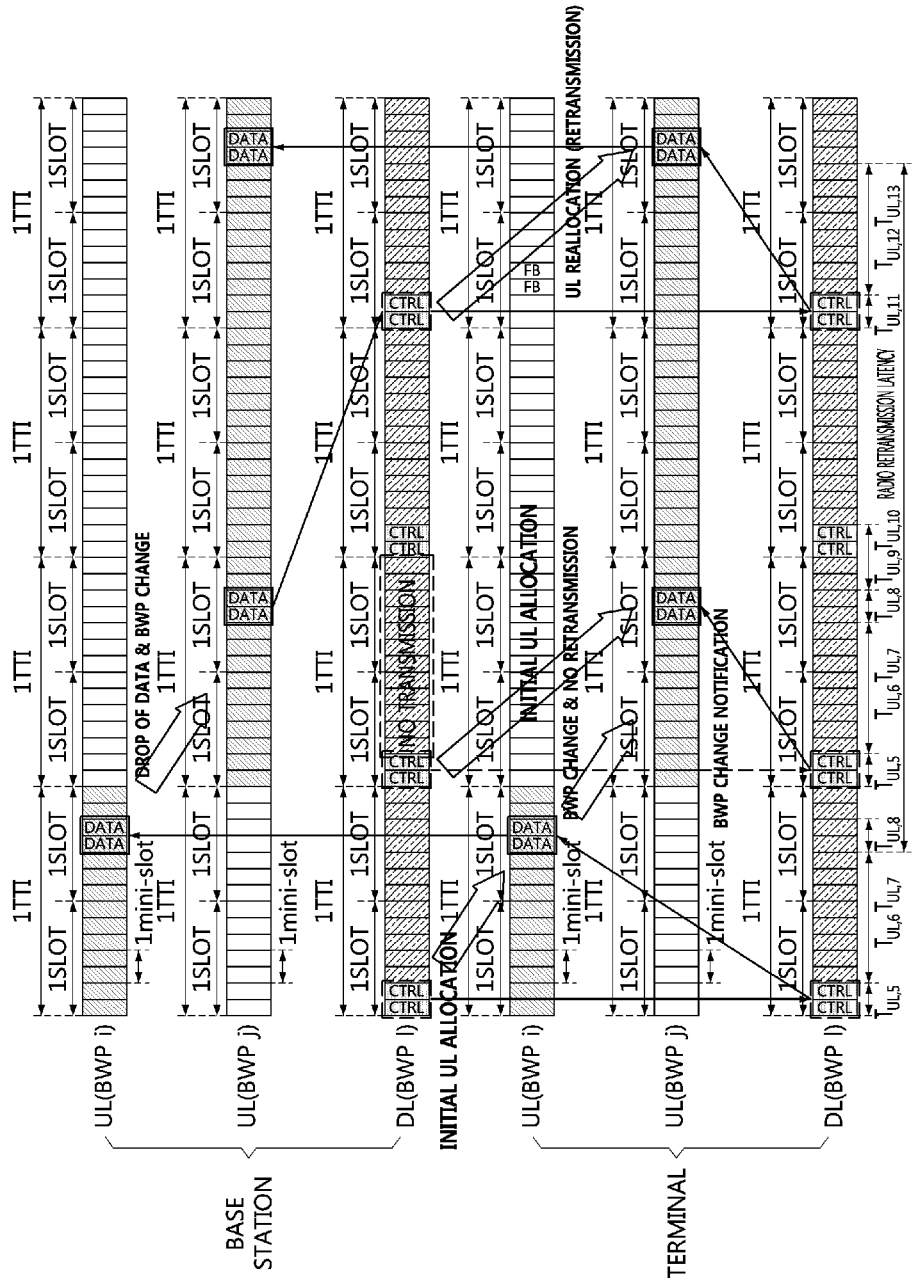
FIG. 10 is a conceptual diagram illustrating a first embodiment of an uplink communication procedure according to a BWP changing method 1 in an FDD communication system.

FIG. 10 is a conceptual diagram illustrating a first embodiment of an uplink communication procedure according to a BWP changing method 1 in an FDD communication system.

Referring to FIG. 10, BWPs i and j may be UL BWPs, and BWP 1 may be a DL BWP. Each of BWPs i, j, and 1 may be a different BWP. $T_{UL,5}$, $T_{UL,6}$, $T_{UL,7}$, $T_{UL,8}$, $T_{UL,9}$, $T_{UL,10}$, $T_{UL,11}$, $T_{UL,12}$ and $T_{UL,13}$ may correspond to $T_{UL,5}$, $T_{UL,6}$, $T_{UL,7}$, $T_{UL,8}$, $T_{UL,9}$, $T_{UL,10}$, $T_{UL,11}$, $T_{UL,12}$ and $T_{UL,13}$ in FIG. 6, respectively. The base station and the terminal may perform uplink communication in BWP i. When a BWP change from BWP i to BWP j is required, the base station may transmit BWP change information indicating the BWP change from BWP i to BWP j through at least one of an RRC message, a MAC CE, and a downlink control channel. For example, the BWP change information may be included in a DCI format 1_1.

The BWP change information may include one or more parameter(s) among a BWP change notification, a BWP changing point, and information indicating a new BWP (e.g., BWP ID, BWP index, bitmap, BWP change pattern). The BWP changing point may be set to a starting point of a first slot, a starting point of a first subframe, a starting point of a first transmission time interval (TTI), an ending point of a guard period (GP), a starting point of an uplink transmission period, or a transmission time point of another downlink control channel after transmission of the downlink control channel (e.g., DCI).

The terminal may receive the BWP change information from the base station by monitoring the downlink control channel, and may identify that the change of the operation BWP (e.g., change from BWP i to BWP j) is requested based on the BWP change information. Also, the terminal may identify the BWP changing point based on the BWP change information. When the BWP change information is received, the terminal may transmit a response (e.g., ACK or NACK) for the BWP change information to the base station. When the positive response (i.e., ACK) for the BWP change information is received from the terminal, the base station may determine that the BWP change information is successfully received at the terminal. When the base station does not receive the positive response (i.e., ACK), receives the negative response (i.e., NACK), or does not receive the response for the BWP change information from the terminal within a predetermined time, the base station may assume that the BWP change information is not received at the terminal. In this case, the base station may request the BWP change by retransmitting the BWP change information or transmitting new BWP change information to the terminal. Meanwhile, when a plurality of BWP change information is received, the terminal may change the BWP based on the information indicated by the latest BWP change information.

The base station and the terminal may change the operation BWP at the time point configured by the base station or at a preconfigured time. For example, when the communication node changes the operation BWP from BWP i to BWP j, the base station and the terminal may terminate the downlink communication procedure from the transmission and reception of the BWP change information until the BWP changing point, and may perform a new uplink communication procedure in BWP j after the operation BWP is changed from BWP i to BWP j.

The terminal may change the operation BWP from BWP i to BWP j even when the data transmission and reception procedure in BWP i is not completed. For example, even when data having not been transmitted to the base station in BWP i exists (e.g., when a NACK for uplink data is received from the base station, when the terminal expects to receive resource allocation information for retransmission of the uplink data, or when a retransmission of a hybrid automatic repeat request (HARQ) response for downlink data is needed), the terminal may change the operation BWP from BWP i to BWP j without performing a corresponding uplink communication procedure (e.g., retransmission of the uplink data, retransmission of the HARQ response).

Since the base station does not expect the uplink data to be retransmitted in BWP i, the base station may stop the corresponding communication operation (e.g., a buffering operation) for uplink data. In this case, the base station may drop data (e.g., soft bits, LLR values) stored in a soft buffer and information (e.g., HARQ process ID, RV, NDI) for receiving the corresponding data and reallocating the uplink data to the corresponding terminal. The terminal may drop the transmission data (e.g., soft bits) stored in a soft buffer and information (e.g., HARQ process ID, RV, NDI) for transmission data.

Figure 11A:
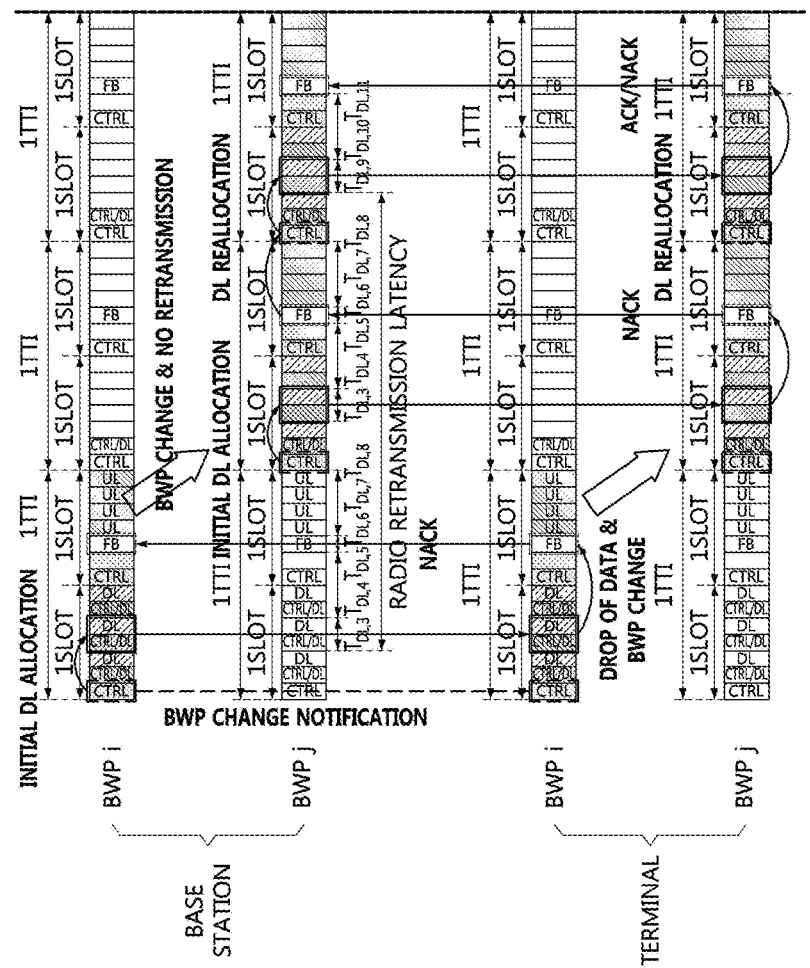
FIG. 11A is a conceptual diagram illustrating a first embodiment of a downlink communication procedure according to a BWP changing method 1 in a TDD communication system.
Figure 11B:
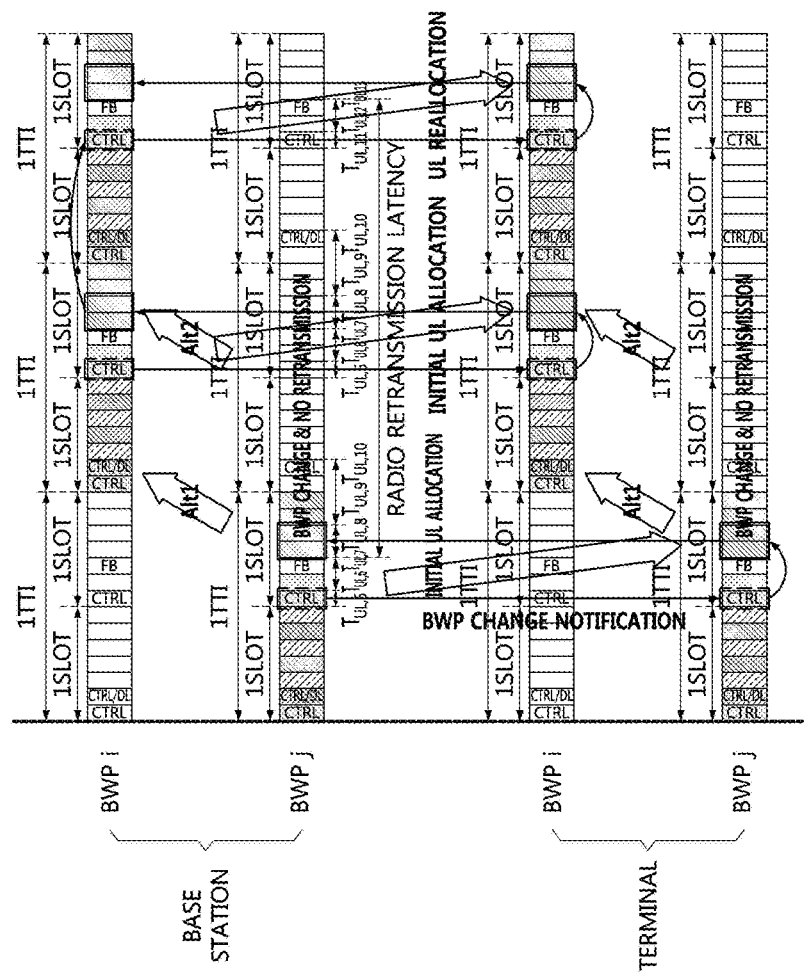
FIG. 11B is a conceptual diagram illustrating a first embodiment of an uplink communication procedure according to a BWP changing method 1 in a TDD communication system.

FIG. 11A is a conceptual diagram illustrating a first embodiment of a downlink communication procedure according to a BWP changing method 1 in a time division duplex (TDD) communication system, and FIG. 11B is a conceptual diagram illustrating a first embodiment of an uplink communication procedure according to a BWP changing method 1 in a TDD communication system.

Referring to FIGS. 11A and 11B, a subframe may be a self-contained (SC) subframe. A structure of a frame (e.g., subframe) may be determined according to transmission of a downlink control/data channel, configuration of downlink data, and configuration of uplink data. Each of BWPs i and j may be a different BWP.

The downlink communication procedure shown in FIG. 11A may be performed in the same or similar manner as the downlink communication procedure shown in FIGS. 9A and 9B. For example, since the terminal does not expect retransmission of downlink data, the terminal may change the operation BWP from BWP i to BWP j regardless of whether the current downlink communication procedure is completed or not. Also, the terminal may stop the corresponding communication procedure (e.g., buffering operation of downlink data), and perform a new downlink communication procedure with the base station in BWP j. Here, $T_{DL,3}$, $T_{DL,4}$, $T_{DL, 5}$, $T_{DL,6}$, $T_{DL,7}$, $T_{DL,8}$, $T_{DL,9}$, $T_{DL,10}$ and $T_{DL,11}$ may correspond to $T_{DL,3}$, $T_{DL,4}$, $T_{DL, 5}$, $T_{DL,6}$, $T_{DL,7}$, $T_{DL,8}$, $T_{DL,9}$, $T_{DL,10}$ and $T_{DL,11}$ in FIG. 5, respectively.

The uplink communication procedure shown in FIG. 11B may be performed in the same or similar manner as the uplink communication procedure shown in FIG. 10. For example, the terminal may terminate the uplink communication procedure (e.g., retransmission of uplink data, retransmission of HARQ response) in BWP j and change the operational BWP from BWP j to BWP i at the BWP changing point. Since the base station does not expect uplink data to be retransmitted in BWP j, the base station may stop the corresponding communication operation (e.g., buffering operation of BWP j). Here, $T_{UL,5}$, $T_{UL,6}$, $T_{UL,7}$, $T_{UL,8}$, $T_{UL,9}$, $T_{UL,10}$, $T_{UL,11}$, $T_{UL,12}$ and $T_{UL,13}$ may correspond to $T_{UL,5}$, $T_{UL,6}$, $T_{UL,7}$, $T_{UL,8}$, $T_{UL,9}$, $T_{UL,10}$, $T_{UL,11}$, $T_{UL,12}$ and $T_{UL,13}$ in FIG. 6, respectively.

Meanwhile, according to the BWP changing method 1 described above, the BWP may be changed irrespective of whether the current downlink or uplink communication procedure is completed or not. Therefore, the implementation complexity (e.g., the complexity of the buffering operation) for BWP change may not increase. However, since the BWP is changed while the downlink or uplink communication procedure is not completed, transmission latency of data may occur and transmission reliability of the communication system may be degraded.

1.1.2 BWP Changing Method 2

When the data transmission or reception is not completed at the BWP changing point, the communication node (e.g., the base station and the terminal) may change the current BWP to the new BWP after completing the data transmission or reception. In this case, the BWP change may be delayed.

Figure 12A:
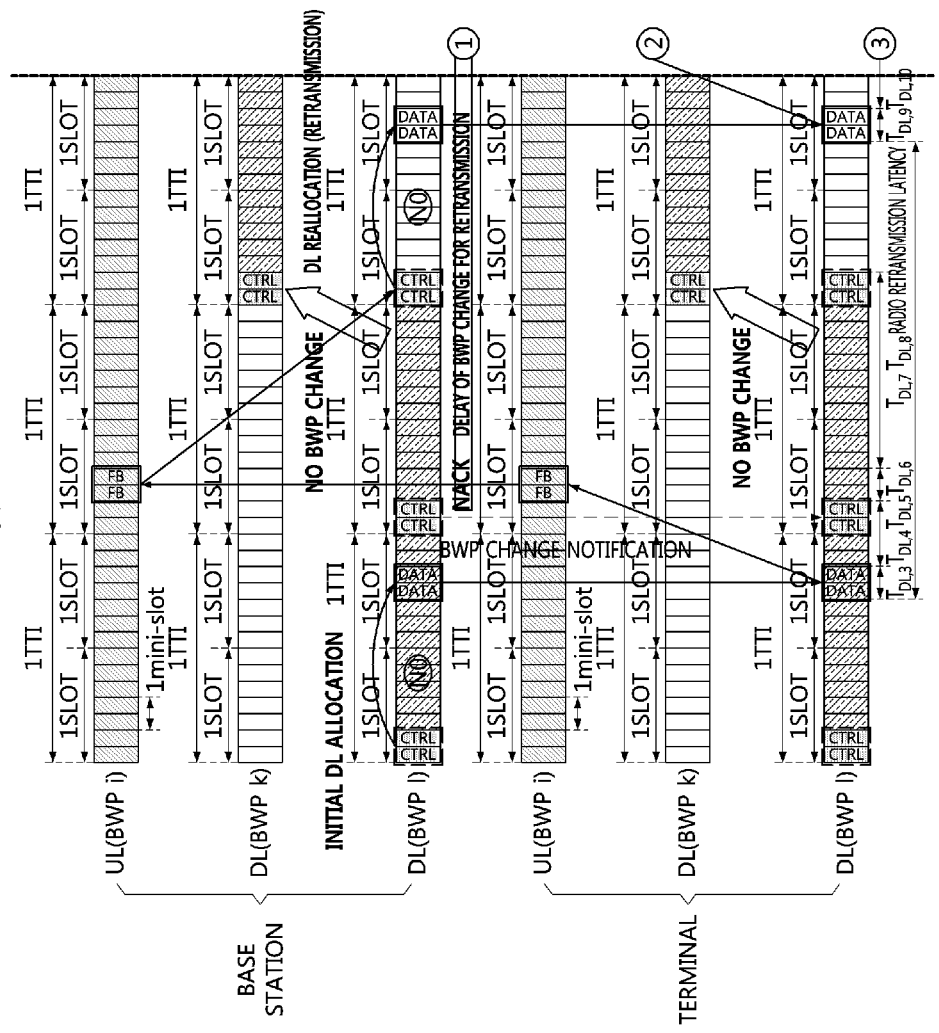
FIGS. 12A and 12B are conceptual diagrams illustrating a first embodiment of a downlink communication procedure according to a BWP changing method 2 in an FDD communication system.
Figure 12B:
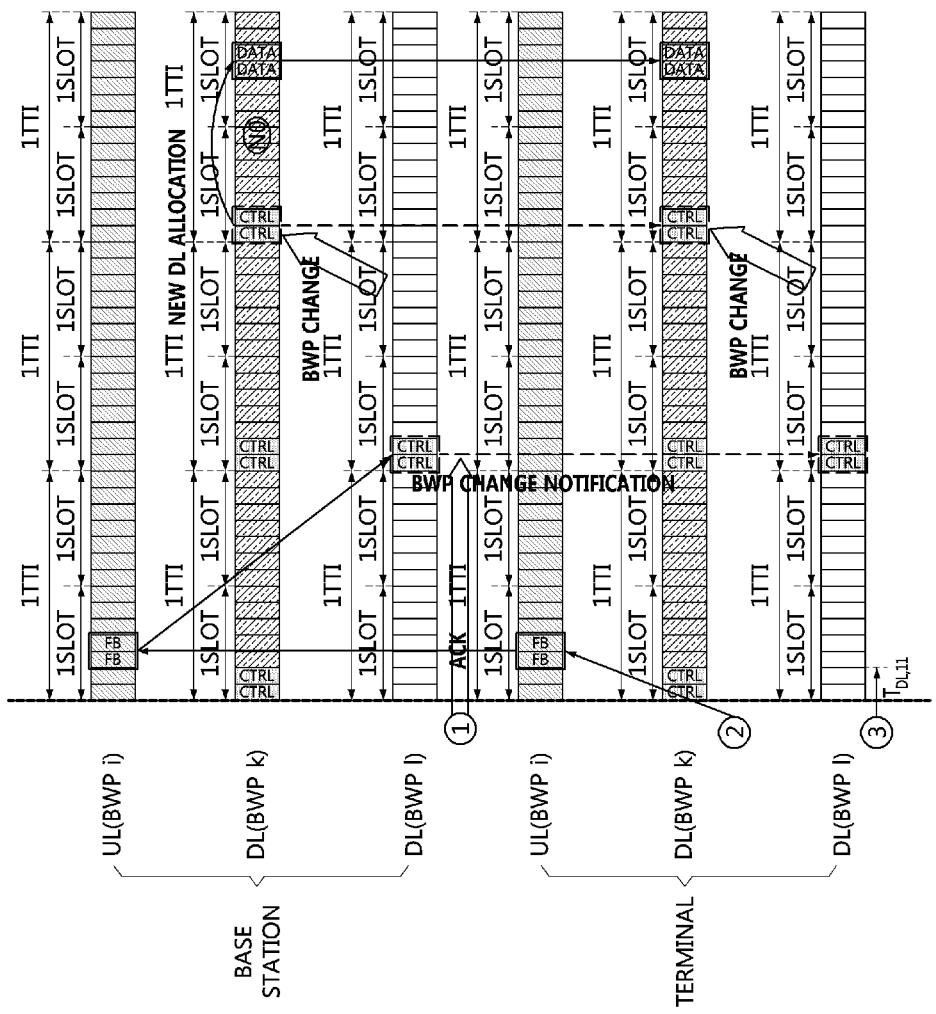

FIGS. 12A and 12B are conceptual diagrams illustrating a first embodiment of a downlink communication procedure according to a BWP changing method 2 in an FDD communication system. In the time axis, the last slots shown in FIG. 12A may be contiguous with the starting slots shown in FIG. 12B. That is, ① shown in FIG. 12A may be continuous with ① shown in FIG. 12B, and the HARQ response of the DATA indicated by ② in FIG. 12A may be the FB indicated by ② in FIG. 12B, and ③ shown in FIG. 12A may be continuous with ③ shown in FIG. 12B. Referring to FIGS. 12A and 12B, BWP i may be a UL BWP, and BWPs k and 1 may be DL BWPs. Each of BWPs i, k, and 1 may be a different BWP. $T_{DL,3}$, $T_{DL,4}$, $T_{DL, 5}$, $T_{DL,6}$, $T_{DL,7}$, $T_{DL,8}$, $T_{DL,9}$, $T_{DL,10}$ and $T_{DL,11}$ may correspond to $T_{DL,3}$, $T_{DL,4}$, $T_{DL, 5}$, $T_{DL,6}$, $T_{DL,7}$, $T_{DL,8}$, $T_{DL,9}$, $T_{DL,10}$ and $T_{DL,11}$ in FIG. 5, respectively. The base station and the terminal may perform downlink communication in BWP 1. When a BWP change from BWP 1 to BWP k is required, the base station may transmit BWP change information indicating the BWP change (e.g., change from BWP 1 to BWP k) through at least one of an RRC message, a MAC CE, and a downlink control channel. For example, the BWP change information may be included in a DCI format 1_1. The BWP change information may include one or more parameter(s) among a BWP change notification, a BWP changing point, and information indicating a new BWP (e.g., BWP ID, BWP index, bitmap, BWP change pattern).

The terminal may receive the BWP change information from the base station by monitoring the downlink control channel, and may identify that the change of the operation BWP (e.g., change from BWP 1 to BWP k) is requested based on the BWP change information. Also, the terminal may identify the BWP changing point based on the BWP change information. When the BWP change information is received, the terminal may transmit a response (e.g., ACK or NACK) for the BWP change information to the base station. When the positive response (i.e., ACK) for the BWP change information is received from the terminal, the base station may determine that the BWP change information is successfully received at the terminal. When the base station does not receive the positive response (i.e., ACK), receives the negative response (i.e., NACK), or does not receive the response for the BWP change information from the terminal within a predetermined time, the base station may assume that the BWP change information is not received at the terminal. In this case, the base station may request the BWP change by retransmitting the BWP change information or transmitting new BWP change information to the terminal. Meanwhile, when a plurality of BWP change information is received, the terminal may change the BWP based on the information indicated by the latest BWP change information.

The base station and the terminal may change the operation BWP at the time point configured by the base station or at a preconfigured time. For example, when the communication node changes the operation BWP from BWP 1 to BWP k and the downlink communication procedure in BWP 1 is not completed at the time of the BWP change (e.g., when the downlink data retransmission procedure is performed), the base station and the terminal may not change the operation BWP from the BWP 1 to BWP k. When the corresponding downlink communication procedure is completed in BWP 1 or the predetermined timer expires regardless of the result of the transmission, the base station and the terminal may change the operation BWP from BWP 1 to BWP k, and perform a new downlink communication procedure in BWP k. That is, the BWP change may be delayed.

Here, the base station may transmit at least one of an RRC message, a MAC CE, and a downlink control channel including the BWP change information again after the downlink communication procedure is completed in BWP 1, and after receiving the BWP change information, the terminal may change the operation BWP from BWP 1 to BWP k. Alternatively, a communication interval (or a timer) for completion of transmission of the downlink data between the base station and the terminal may be configured in advance. In this case, the base station and the terminal may complete the downlink communication procedure in the preconfigured communication interval (or time), and change the operation BWP from BWP 1 to BWP k after the preconfigured communication interval ends (or timer expires). Alternatively, the base station and the terminal may change the operation BWP from BWP 1 to BWP k after a preconfigured duration from the completion of the downlink communication procedure. Meanwhile, when a plurality of BWP change information is received, the terminal may change the operation BWP based on information indicated by the latest BWP change information.

According to the BWP changing method 2, the BWP change in the downlink transmission procedure may be delayed. When a priority of a signal transmitted in the new BWP (e.g., BWP k) is higher than a priority of a signal transmitted in the current BWP (e.g., BWP 1), when the number of HARQ retransmissions in the current BWP (e.g., BWP 1) is equal to the maximum number of retransmissions, or when a HARQ retransmission timer expires at the current BWP (e.g., BWP 1), the base station and the terminal may terminate the downlink transmission procedure in the current BWP (e.g., BWP 1) according to the BWP changing method 1 instead of the BWP changing method 2, and change the operation BWP from the current BWP (e.g., BWP 1) to the new BWP (e.g., BWP k) at the BWP changing point. Here, a priority of signals (e.g., synchronization signal, reference signal, feedback of data transmission, and system information) transmitted according to a specific period or timing may be higher than a priority of data signal.

Figure 13:
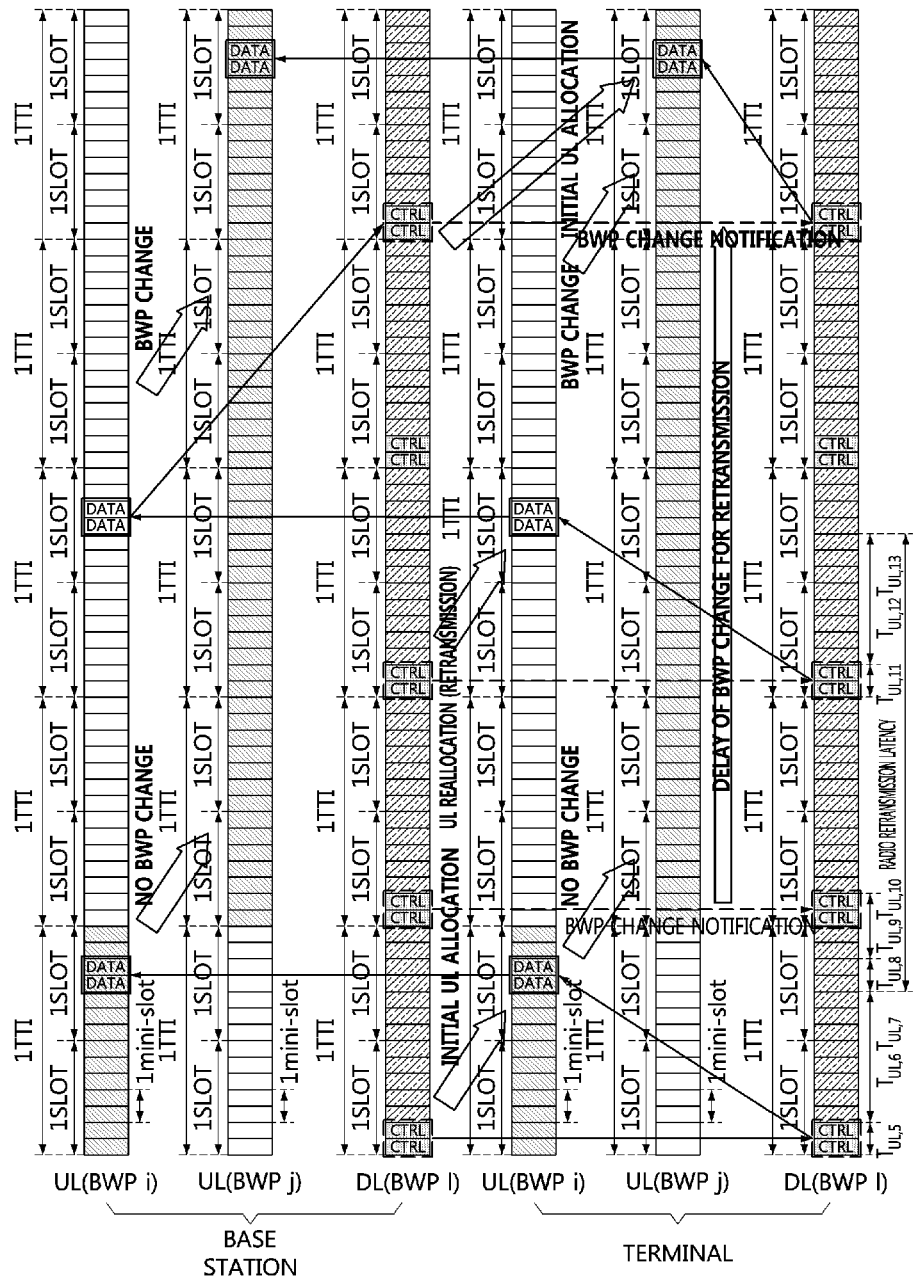
FIG. 13 is a conceptual diagram illustrating a first embodiment of an uplink communication procedure according to a BWP changing method 2 in an FDD communication system.

FIG. 13 is a conceptual diagram illustrating a first embodiment of an uplink communication procedure according to a BWP changing method 2 in an FDD communication system.

Referring to FIG. 13, BWPs i and j may be UL BWPs, and BWP 1 may be a DL BWP. Each of BWPs i, j, and 1 may be a different BWP. $T_{UL,5}$, $T_{UL,6}$, $T_{UL,7}$, $T_{UL,8}$, $T_{UL,9}$, $T_{UL,10}$, $T_{UL,11}$, $T_{UL,12}$ and $T_{UL,13}$ may correspond to $T_{UL,5}$, $T_{UL,6}$, $T_{UL,7}$, $T_{UL,8}$, $T_{UL,9}$, $T_{UL,10}$, $T_{UL,11}$, $T_{UL,12}$ and $T_{UL,13}$ in FIG. 6, respectively. The base station and the terminal may perform uplink communication in BWP i. When a BWP change from BWP i to BWP j is required, the base station may transmit BWP change information indicating the change from BWP i to BWP j through at least one of an RRC message, a MAC CE, and a downlink control channel. For example, the BWP change information may be included in a DCI format 1_1. The BWP change information may include one or more parameter(s) among a BWP change notification, a BWP changing point, and information indicating a new BWP (e.g., BWP ID, BWP index, bitmap, BWP change pattern).

The terminal may receive the BWP change information from the base station by monitoring the downlink control channel, and may identify that the change of the operation BWP (e.g., change from BWP i to BWP j) is requested based on the BWP change information. Also, the terminal may identify the BWP changing point based on the BWP change information. When the BWP change information is received, the terminal may transmit a response (e.g., ACK or NACK) for the BWP change information to the base station. When the positive response (i.e., ACK) for the BWP change information is received from the terminal, the base station may determine that the BWP change information is successfully received at the terminal. When the base station does not receive the positive response (i.e., ACK), receives the negative response (i.e., NACK), or does not receive the response for the BWP change information from the terminal within a predetermined time, the base station may assume that the BWP change information is not received at the terminal. In this case, the base station may request the BWP change by retransmitting the BWP change information or transmitting new BWP change information to the terminal. Meanwhile, when a plurality of BWP change information is received, the terminal may change the BWP based on the information indicated by the latest BWP change information.

The base station and the terminal may change the operation BWP at the time point configured by the base station or at a preconfigured time. For example, when the communication node changes the operation BWP from BWP i to BWP j and data having not been transmitted to the base station exists at the terminal in BWP i at the time of the BWP change (e.g., when a NACK for uplink data is received from the base station, when the terminal expects to receive resource allocation information for retransmission of uplink data, or when retransmission of a HARQ response for uplink data is needed), the base station and the terminal may not change the operation BWP from BWP i to BWP j at the BWP changing point. In this case, the base station and the terminal may perform an uplink retransmission procedure for the corresponding uplink data in BWP i, change the operational BWP from BWP i to BWP j when the uplink retransmission procedure is completed or the predetermined timer expires regardless of the result of the transmission, and perform a new uplink communication procedure in BWP j. That is, the BWP change may be delayed.

Here, the base station may transmit at least one of an RRC message, a MAC CE, and a downlink control channel including the BWP change information again after the uplink communication procedure is completed in BWP i, and after receiving the BWP change information, the terminal may change the operation BWP from BWP i to BWP j. Alternatively, a communication interval (or a timer) for completion of transmission of the uplink data between the base station and the terminal may be configured in advance. In this case, the base station and the terminal may complete the uplink communication procedure in the preconfigured communication interval (or time), and change the operation BWP from BWP i to BWP j after the preconfigured communication interval ends (or timer expires). Alternatively, the base station and the terminal may change the operation BWP from BWP i to BWP j after a preconfigured duration from the completion of the uplink communication procedure. Meanwhile, when a plurality of BWP change information is received, the terminal may change the operation BWP based on information indicated by the latest BWP change information.

According to the BWP changing method 2, the BWP change in the uplink transmission procedure may be delayed. When a priority of a signal transmitted in the new BWP (e.g., BWP j) is higher than a priority of a signal transmitted in the current BWP (e.g., BWP i), when the number of HARQ retransmissions in the current BWP (e.g., BWP i) is equal to the maximum number of retransmissions, or when a HARQ retransmission timer expires at the current BWP (e.g., BWP i), the base station and the terminal may terminate the uplink transmission procedure in the current BWP (e.g., BWP i) according to the BWP changing method 1 instead of the BWP changing method 2, and change the operation BWP from the current BWP (e.g., BWP i) to the new BWP (e.g., BWP j) at the BWP changing point. Here, a priority of signals (e.g., synchronization signal, reference signal, feedback of data transmission, and system information) transmitted according to a specific period or timing may be higher than a priority of data signal.

Figure 14A:
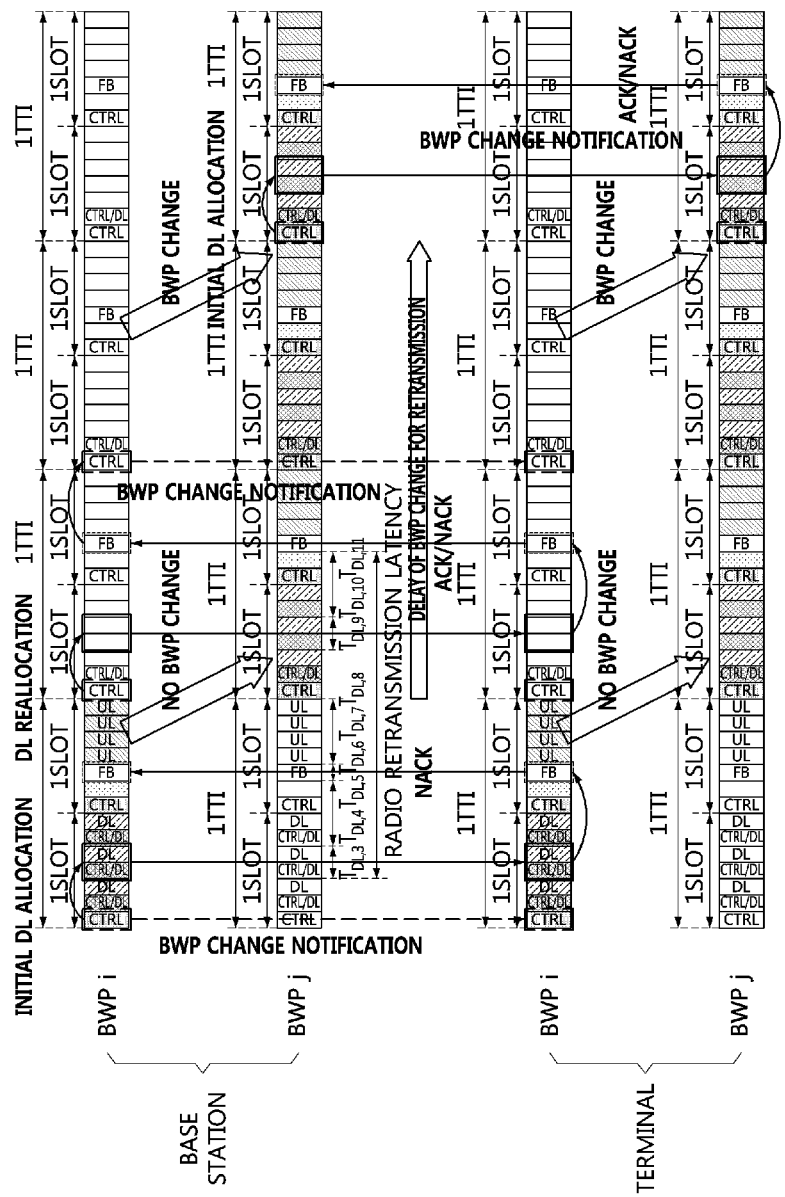
FIG. 14A is a conceptual diagram illustrating a first embodiment of a downlink communication procedure according to a BWP changing method 2 in a TDD communication system.
Figure 14B:
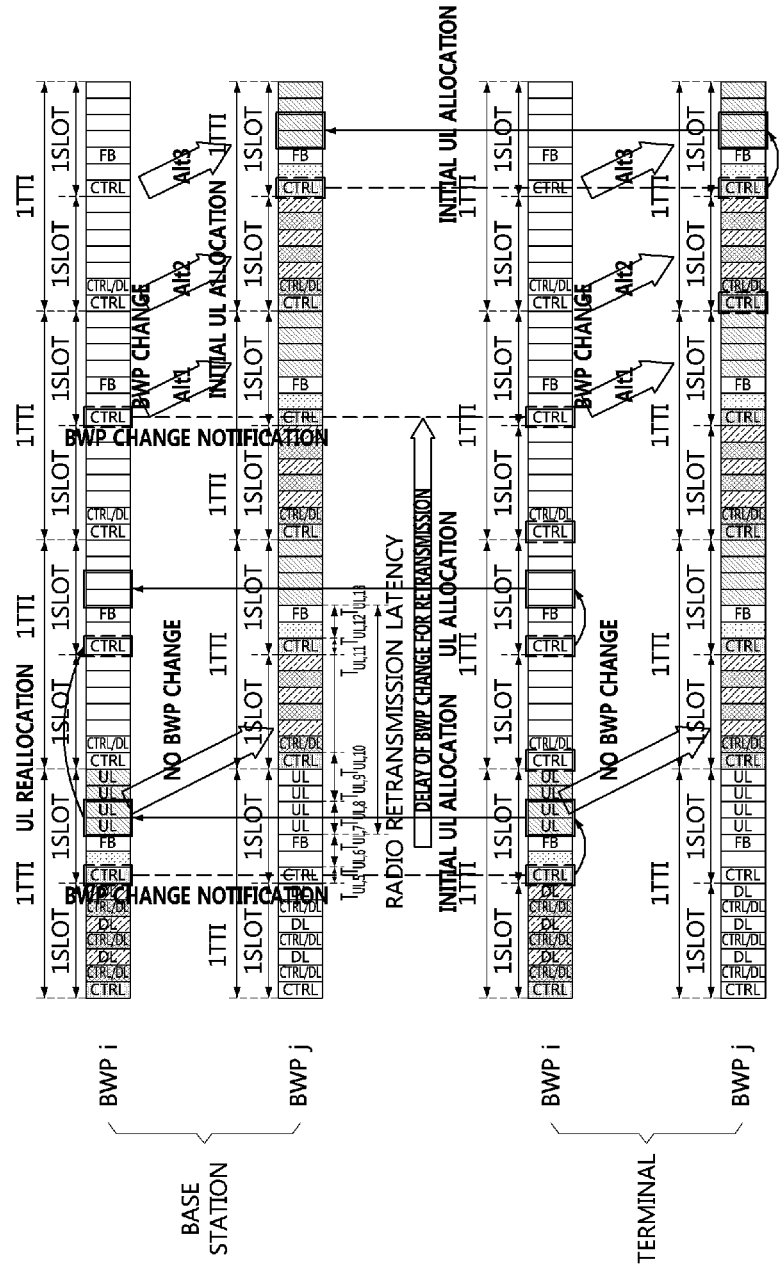
FIG. 14B is a conceptual diagram illustrating a first embodiment of an uplink communication procedure according to a BWP changing method 2 in a TDD communication system.

FIG. 14A is a conceptual diagram illustrating a first embodiment of a downlink communication procedure according to a BWP changing method 2 in a TDD communication system, and FIG. 14B is a conceptual diagram illustrating a first embodiment of an uplink communication procedure according to a BWP changing method 2 in a TDD communication system.

Referring to FIGS. 14A and 14B, a subframe may be an SC subframe. A structure of a frame (e.g., subframe) may be determined according to transmission of a downlink control/data channel, configuration of downlink data, and configuration of uplink data. Each of BWPs i and j may be a different BWP.

The downlink communication procedure shown in FIG. 14A may be performed in the same or similar manner as the downlink communication procedure shown in FIG. 12A. For example, the base station and the terminal may not change the operation BWP from BWP i to BWP j when the downlink transmission procedure is not completed at the time of BWP change. In this case, when the downlink transmission procedure is completed in BWP i or the predetermined timer expires regardless of the result of the transmission (e.g., the number of HARQ retransmissions in BWP i is equal to the maximum retransmission number, or the HARQ retransmission timer expires in BWP i), the base station and the terminal may change the operation BWP from BWP i to BWP j. Therefore, the BWP change may be delayed. Here, $T_{DL,3}$, $T_{DL,4}$, $T_{DL,5}$, $T_{DL,6}$, $T_{DL,7}$, $T_{DL,8}$, $T_{DL,9}$, $T_{DL,10}$ and $T_{DL,11}$ may correspond to $T_{DL,3}$, $T_{DL,4}$, $T_{DL,5}$, $T_{DL,6}$, $T_{DL,7}$, $T_{DL,8}$, $T_{DL,9}$, $T_{DL,10}$ and $T_{DL,11}$ in FIG. 5, respectively.

The uplink communication procedure shown in FIG. 14B may be performed in the same or similar manner as the uplink communication procedure shown in FIG. 13. For example, the base station and the terminal may not change the operation BWP from BWP i to BWP j when the uplink transmission procedure is not completed at the time of BWP change. In this case, the base station and the terminal may perform the uplink retransmission procedure for the corresponding data, change the operation BWP from BWP i to the new BWP j when the uplink retransmission procedure is completed, and perform a new uplink communication procedure in BWP j. Therefore, the BWP change can be delayed. Here, $T_{UL,5}$, $T_{UL,6}$, $T_{UL,7}$, $T_{UL,8}$, $T_{UL,9}$, $T_{UL,10}$, $T_{UL,11}$, $T_{UL,12}$ and $T_{UL,13}$ may correspond to $T_{UL,5}$, $T_{UL,6}$, $T_{UL,7}$, $T_{UL,8}$, $T_{UL,9}$, $T_{UL,10}$, $T_{UL,11}$, $T_{UL,12}$ and $T_{UL,13}$ in FIG. 6, respectively.

Here, the base station may transmit at least one of an RRC message, a MAC CE, and a downlink control channel including the BWP change information again after the downlink/uplink communication procedure is completed in BWP 1, and after receiving the BWP change information, the terminal may change the operation BWP from BWP i to BWP j. Alternatively, a communication interval (or a timer) for completion of transmission of the downlink data or uplink data between the base station and the terminal may be configured in advance. In this case, the base station and the terminal may complete the downlink/uplink communication procedure in the preconfigured communication interval, and change the operation BWP from BWP i to BWP j after the preconfigured communication interval ends. Alternatively, the base station and the terminal may change the operation BWP from BWP i to BWP j after a preconfigured duration from the completion of the downlink/uplink communication procedure. Meanwhile, when a plurality of BWP change information is received, the terminal may change the operation BWP based on information indicated by the latest BWP change information.

Also, when the BWP change information is received, the terminal may transmit a response (e.g., ACK or NACK) for the BWP change information to the base station. When the positive response (i.e., ACK) for the BWP change information is received from the terminal, the base station may determine that the BWP change information is successfully received at the terminal. When the base station does not receive the positive response (i.e., ACK), receives the negative response (i.e., NACK), or does not receive the response for the BWP change information from the terminal within a predetermined time, the base station may assume that the BWP change information is not received at the terminal. In this case, the base station may request the BWP change by retransmitting the BWP change information or transmitting new BWP change information to the terminal. Meanwhile, when a plurality of BWP change information is received, the terminal may change the BWP based on the information indicated by the latest BWP change information.

On the other hand, according to the above-described BWP changing method 2, the transmission latency of data may not occur, and the reliability of the communication system may not be deteriorated. However, the BWP change may be delayed and the transmission latency of data (e.g., data having a high priority) in the new BWP may occur.

1.1.3 BWP Changing Method 3

Not only when the transmission or reception of data is completed at the time of BWP change but also when the transmission or reception of data is not completed at the time of BWP change, the communication node (e.g., base station and terminal) may change the operation BWP (e.g., BWP 1) to the new BWP (e.g., BWP k), and perform a transmission or reception procedure of new data in BWP k. However, when the transmission or reception of the data is not completed in BWP 1, the communication node may suspend (e.g., stop) the transmission or reception of the data in BWP 1 from the time of BWP change. In this case, the data (e.g., soft bits, LLR values) stored in the soft buffer of the communication node and information (e.g., HARQ process ID, RV, NDI) for resuming the data transmission/reception procedure may be retained without being discarded. When the transmission or reception procedure of the new data in BWP k is completed, the communication node may change the operation BWP from BWP k to BWP 1, and may resume the transmission or reception of the data suspended in BWP 1.

Figure 15A:
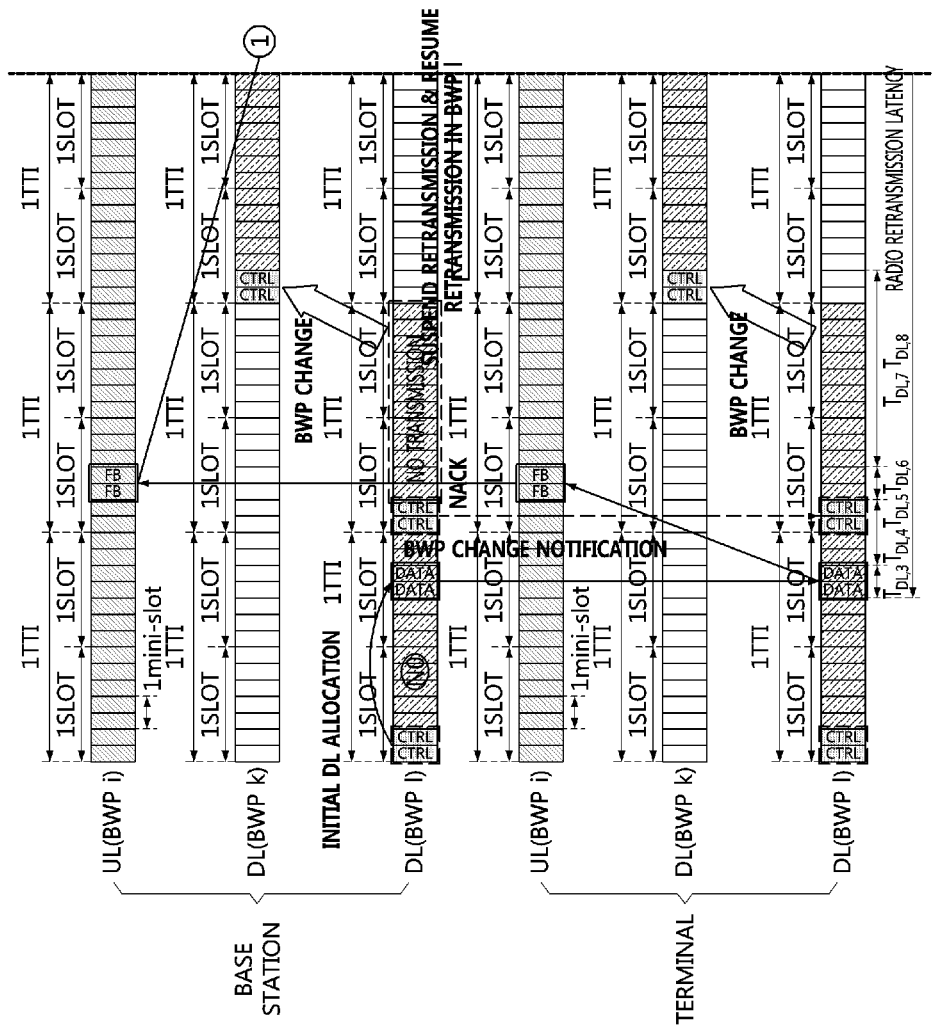
FIGS. 15A and 15B are conceptual diagrams illustrating a first embodiment of a downlink communication procedure according to a BWP changing method 3 in an FDD communication system.
Figure 15B:
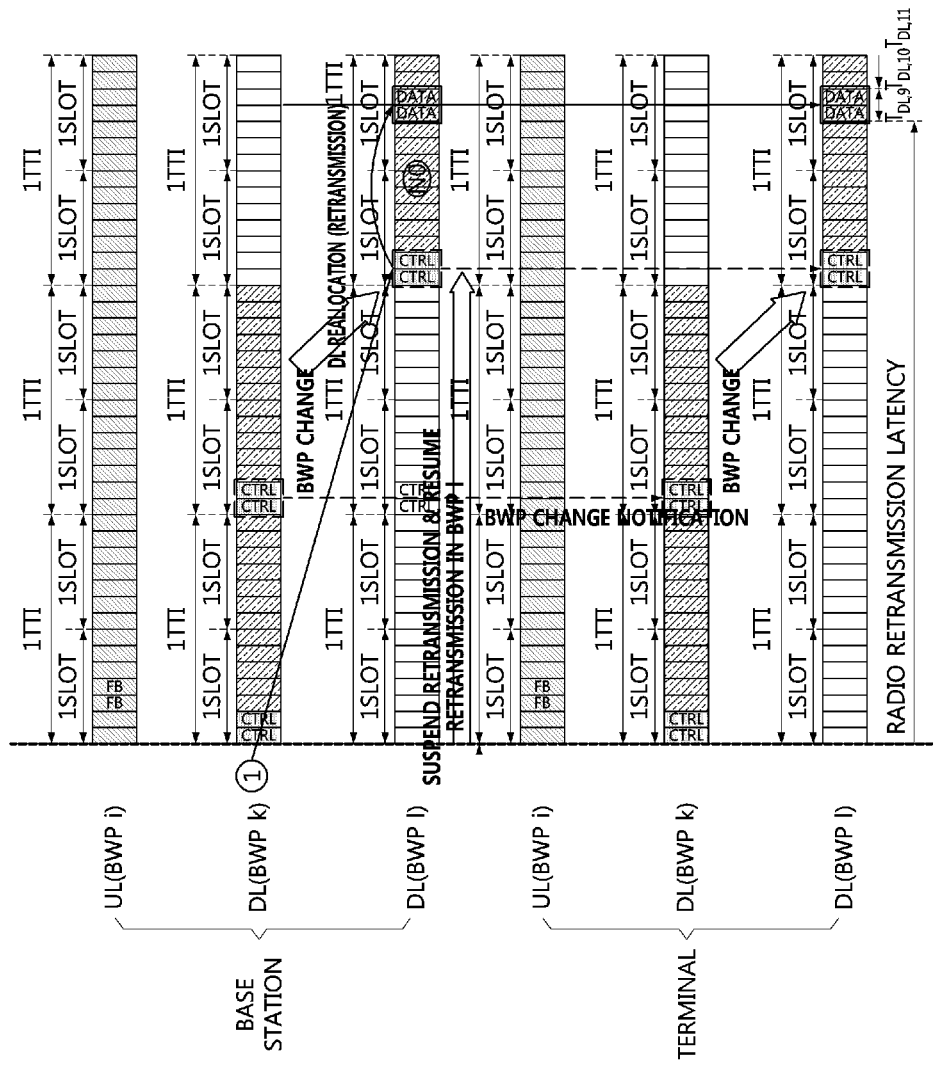

FIGS. 15A and 15B are conceptual diagrams illustrating a first embodiment of a downlink communication procedure according to a BWP changing method 3 in an FDD communication system.

Referring to FIGS. 15A and 15B, BWP i may be a UL BWP, and BWPs k and 1 may be DL BWPs. Each of BWPs i, k, and 1 may be a different BWP. In the time axis, the last slots shown in FIG. 15A may be contiguous with the starting slots shown in FIG. 15B. That is, the resource allocation information for retransmission according to the FB (e.g., NACK) indicated by ① in FIG. 15A may be transmitted through the control channel (CTRL) indicated by ① In FIG. 15B. $T_{DL,3}$, $T_{DL,4}$, $T_{DL,5}$, $T_{DL,6}$, $T_{DL,7}$, $T_{DL,8}$, $T_{DL,9}$, $T_{DL,10}$ and $T_{DL,11}$ may correspond to $T_{DL,3}$, $T_{DL,4}$, $T_{DL,5}$, $T_{DL,6}$, $T_{DL,7}$, $T_{DL,8}$, $T_{DL,9}$, $T_{DL,10}$ and $T_{DL,11}$ in FIG. 5, respectively. The base station and the terminal may perform downlink communication in BWP 1. When a BWP change from BWP 1 to BWP k is required, the base station may transmit BWP change information indicating the change from BWP 1 to BWP k through at least one of an RRC message, a MAC CE, and a downlink control channel. For example, the BWP change information may be included in a DCI format 1_1.

The BWP change information may include one or more parameter(s) among a BWP change notification, a BWP changing point, and information indicating a new BWP (e.g., BWP ID, BWP index, bitmap, BWP change pattern). The BWP changing point may be set to a starting point of a first slot, a starting point of a first subframe, a starting point of a first transmission time interval (TTI), an ending point of a guard period (GP), a starting point of an uplink transmission period, or a transmission time point of another downlink control channel after transmission of the downlink control channel (e.g., DCI).

The terminal may receive the BWP change information from the base station by monitoring the downlink control channel, and may identify that the change of the operation BWP (e.g., change from BWP 1 to BWP k) is requested based on the BWP change information. Also, the terminal may identify the BWP changing point based on the BWP change information. When the BWP change information is received, the terminal may transmit a response (e.g., ACK or NACK) for the BWP change information to the base station. When the positive response (i.e., ACK) for the BWP change information is received from the terminal, the base station may determine that the BWP change information is successfully received at the terminal. When the base station does not receive the positive response (i.e., ACK), receives the negative response (i.e., NACK), or does not receive the response for the BWP change information from the terminal within a predetermined time, the base station may assume that the BWP change information is not received at the terminal. In this case, the base station may request the BWP change by retransmitting the BWP change information or transmitting new BWP change information to the terminal. Meanwhile, when a plurality of BWP change information is received, the terminal may change the BWP based on the information indicated by the latest BWP change information.

The base station and the terminal may change the operation BWP at the time point configured by the base station or at a preconfigured time. For example, when the communication node changes the operation BWP from BWP 1 to BWP k, the base station and the terminal may suspend (e.g., stop) the downlink communication procedure from the transmission and reception of the BWP change information until the BWP changing point, and may perform a new downlink communication procedure in BWP k after the operation BWP is changed from BWP1 to BWP k.

Even when the transmission or reception procedure of the data in BWP 1 is not completed, the terminal may change the operation BWP from BWP 1 to BWP k. For example, even when a NACK for downlink data is transmitted to the base station in BWP 1, the terminal may change the operation BWP from BWP 1 to BWP k. In this case, the terminal may expect that the suspended downlink communication procedure in BWP 1 is to be resumed after the new data transmission or reception procedure is completed in BWP k. Thus, the terminal may maintain the data (e.g., soft bits, LLR values) stored in the soft buffer and information (e.g., HARQ process ID, RV, NDI) for resuming the data transmission/reception procedure without discarding.

When the data transmission or reception procedure in BWP 1 is not completed and the data transmission or reception procedure in BWP k is completed after changing the operation BWP from BWP 1 to BWP k, the base station may transmit BWP change information indicating a BWP change (e.g., change from BWP k to BWP 1) through at least one of an RRC message, a MAC CE, and a downlink control channel. The BWP change information may include one or more parameter(s) among a BWP change notification, a BWP changing point, and information indicating a new BWP (e.g., BWP ID, BWP index, bitmap, BWP change pattern).

The terminal may receive the BWP change information from the base station by monitoring the downlink control channel, and may identify that the change of the operation BWP (e.g., change from BWP k to BWP 1) is requested based on the BWP change information. Also, the terminal may identify the BWP changing point based on the BWP change information. When the BWP change information is received, the terminal may transmit a response (e.g., ACK or NACK) for the BWP change information to the base station. When the positive response (i.e., ACK) for the BWP change information is received from the terminal, the base station may determine that the BWP change information is successfully received at the terminal. When the base station does not receive the positive response (i.e., ACK), receives the negative response (i.e., NACK), or does not receive the response for the BWP change information from the terminal within a predetermined time, the base station may assume that the BWP change information is not received at the terminal. In this case, the base station may request the BWP change by retransmitting the BWP change information or transmitting new BWP change information to the terminal. Meanwhile, when a plurality of BWP change information is received, the terminal may change the BWP based on the information indicated by the latest BWP change information.

The base station and the terminal may change the operation BWP from BWP k to BWP 1 at the time of BWP change, and may resume the suspended transmission or reception procedure of the data in BWP 1. For example, a retransmission procedure of the data may be performed in BWP1.

Figure 16:
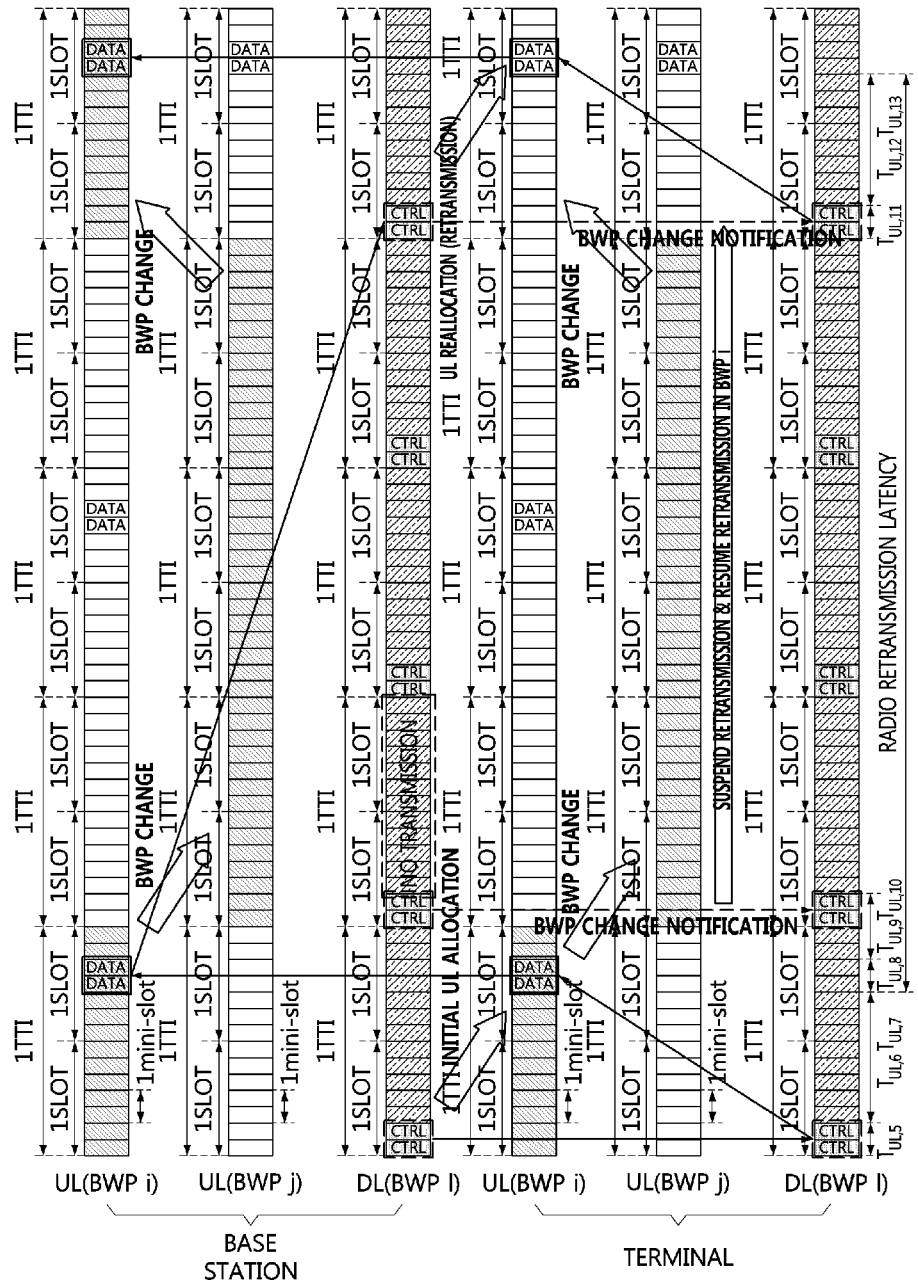
FIG. 16 is a conceptual diagram illustrating a first embodiment of an uplink communication procedure according to a BWP changing method 3 in an FDD communication system.

FIG. 16 is a conceptual diagram illustrating a first embodiment of an uplink communication procedure according to a BWP changing method 3 in an FDD communication system.

Referring to FIG. 16, BWPs i and j may be UL BWPs, and BWP 1 may be a DL BWP. Each of BWPs i, j, and 1 may be a different BWP. $T_{UL,5}$, $T_{UL,6}$, $T_{UL,7}$, $T_{UL,8}$, $T_{UL,9}$, $T_{UL,10}$, $T_{UL,11}$, $T_{UL,12}$ and $T_{UL,13}$ may correspond to $T_{UL,5}$, $T_{UL,6}$, $T_{UL,7}$, $T_{UL,8}$, $T_{UL,9}$, $T_{UL,10}$, $T_{UL,11}$, $T_{UL,12}$ and $T_{UL,13}$ in FIG.

6, respectively. The base station and the terminal may perform uplink communication in BWP i. When a BWP change from BWP i to BWP j is required, the base station may transmit BWP change information indicating the change from BWP i to BWP j through at least one of an RRC message, a MAC CE, and a downlink control channel. The BWP change information may include one or more parameter(s) among a BWP change notification, a BWP changing point, and information indicating a new BWP (e.g., BWP ID, BWP index, bitmap, BWP change pattern).

The terminal may receive the BWP change information from the base station by monitoring the downlink control channel, and may identify that the change of the operation BWP (e.g., change from BWP i to BWP j) is requested based on the BWP change information. Also, the terminal may identify the BWP changing point based on the BWP change information. When the BWP change information is received, the terminal may transmit a response (e.g., ACK or NACK) for the BWP change information to the base station. When the positive response (i.e., ACK) for the BWP change information is received from the terminal, the base station may determine that the BWP change information is successfully received at the terminal. When the base station does not receive the positive response (i.e., ACK), receives the negative response (i.e., NACK), or does not receive the response for the BWP change information from the terminal within a predetermined time, the base station may assume that the BWP change information is not received at the terminal. In this case, the base station may request the BWP change by retransmitting the BWP change information or transmitting new BWP change information to the terminal. Meanwhile, when a plurality of BWP change information is received, the terminal may change the BWP based on the information indicated by the latest BWP change information.

The base station and the terminal may change the operation BWP at the time point configured by the base station or at a preconfigured time. For example, when the communication node changes the operating BWP from BWP i to BWP j, the base station and the terminal may suspend (e.g., stop) the uplink communication procedure from the transmission and reception of the BWP change information until the BWP changing point, and may perform a new uplink communication procedure in BWP j after the operation BWP is changed from BWP i to BWP j.

Even when the transmission or reception procedure of the data in BWP i is not completed, the terminal may change the operation BWP from BWP i to BWP j. For example, when data having not been transmitted to the base station in BWP i exists in the terminal (e.g., when a NACK for uplink data is received, when the terminal expects to receive resource allocation information for retransmission of uplink data, or when a retransmission of a HARQ response for downlink data is needed), the terminal may suspend (e.g., stop) the corresponding uplink communication procedure (e.g., retransmission of uplink data, retransmission of the HARQ response), and change the operation BWP from BWP i to BWP j.

In this case, the base station may expect that the uplink communication procedure suspended in BWP i is to be resumed after the new data transmission or reception procedure is completed in BWP j. Thus, the base station may maintain the data (e.g., soft bits, LLR values) stored in the soft buffer and information (e.g., HARQ process ID, RV, NDI) for receiving the corresponding data and reallocating the uplink data to the corresponding terminal without discarding. Terminal may maintain the transmission data (e.g., soft bits) stored in the soft buffer and information (e.g., HARQ process ID, RV, NDI) for the transmission data without discarding.

When the data transmission or reception procedure in BWP i is not completed and the data transmission or reception procedure in BWP j is completed after changing the operation BWP from BWP i to BWP j, the base station may transmit BWP change information indicating a BWP change (e.g., change from BWP j to BWP i) through at least one of an RRC message, a MAC CE, and a downlink control channel. The BWP change information may include one or more parameter(s) among a BWP change notification, a BWP changing point, and information indicating a new BWP (e.g., BWP ID, BWP index, bitmap, BWP change pattern).

The terminal may receive the BWP change information from the base station by monitoring the downlink control channel, and may identify that the change of the operation BWP (e.g., change from BWP j to BWP i) is requested based on the BWP change information. Also, the terminal may identify the BWP changing point based on the BWP change information. When the BWP change information is received, the terminal may transmit a response (e.g., ACK or NACK) for the BWP change information to the base station. When the positive response (i.e., ACK) for the BWP change information is received from the terminal, the base station may determine that the BWP change information is successfully received at the terminal. When the base station does not receive the positive response (i.e., ACK), receives the negative response (i.e., NACK), or does not receive the response for the BWP change information from the terminal within a predetermined time, the base station may assume that the BWP change information is not received at the terminal. In this case, the base station may request the BWP change by retransmitting the BWP change information or transmitting new BWP change information to the terminal. Meanwhile, when a plurality of BWP change information is received, the terminal may change the BWP based on the information indicated by the latest BWP change information.

The base station and the terminal may change the operation BWP from BWP j to BWP i at the time of BWP change, and may resume the suspended transmission or reception procedure of the data in BWP i. For example, a retransmission procedure of the data may be performed in BWP i.

Alternatively, when the data transmission or reception procedure in BWP i is not completed and the data transmission or reception procedure in BWP j is completed after changing the operation BWP from BWP i to BWP j, the base station and the terminal may change the operation BWP from BWP j to BWP i without signalling of the BWP change information. For example, the base station and the terminal may change the operation BWP from BWP j to BWP i after a preconfigured duration from the completion of the data transmission or reception procedure in BWP j, and resume the suspended transmission or reception procedure of the data in BWP i. Here, the preconfigured duration may be set by at least one of an RRC message, a MAC CE, and a downlink control channel.

Figure 17A:
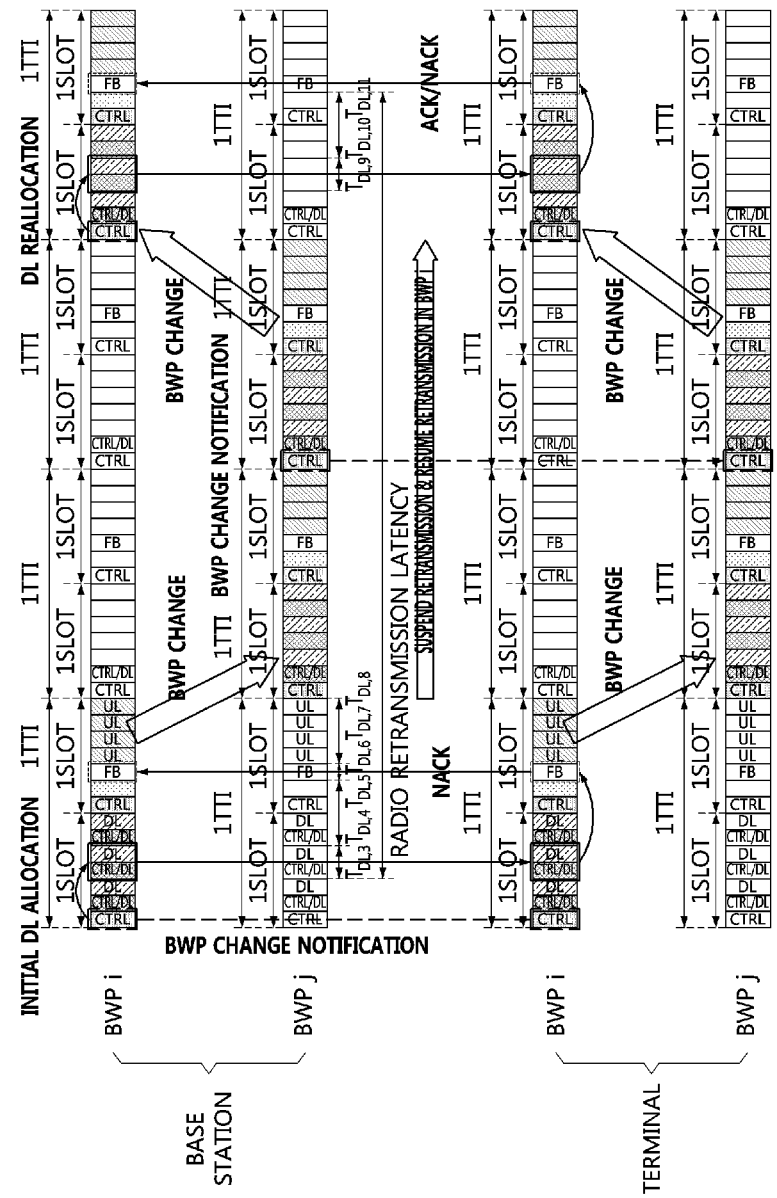
FIG. 17A is a conceptual diagram illustrating a first embodiment of a downlink communication procedure according to a BWP changing method 3 in a TDD communication system.
Figure 17B:
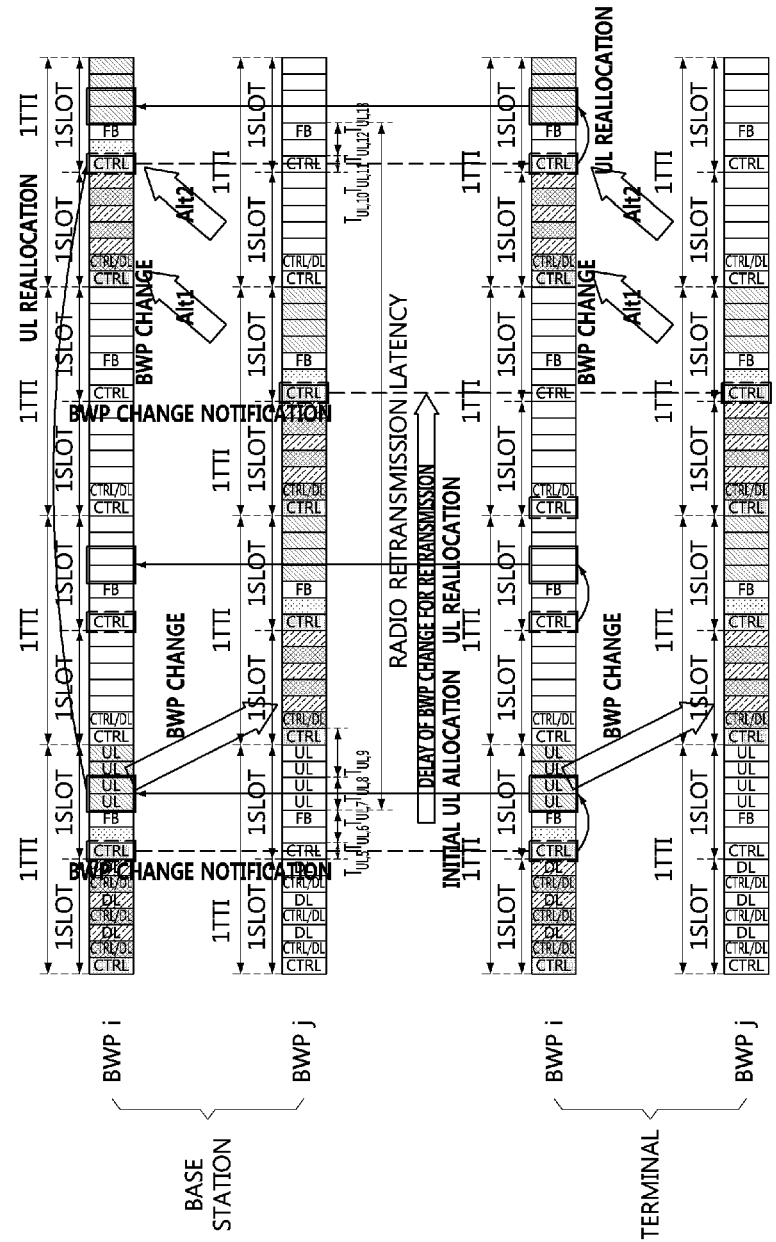
FIG. 17B is a conceptual diagram illustrating a first embodiment of an uplink communication procedure according to a BWP changing method 3 in a TDD communication system.

FIG. 17A is a conceptual diagram illustrating a first embodiment of a downlink communication procedure according to a BWP changing method 3 in a TDD communication system, and FIG. 17B is a conceptual diagram illustrating a first embodiment of an uplink communication procedure according to a BWP changing method 3 in a TDD communication system.

Referring to FIGS. 17A and 17B, a subframe may be an SC subframe. A structure of a frame (e.g., subframe) may be determined according to transmission of a downlink control/data channel, configuration of downlink data, and configuration of uplink data. Each of BWPs i and j may be a different BWP.

The downlink communication procedure shown in FIG. 17A may be performed in the same or similar manner as the downlink communication procedure shown in FIG. 15A. The base station and the terminal may change the operation BWP at the time point configured by the base station or at a preconfigured time. For example, even when the communication node changes the operation BWP from BWP i to BWP j and the transmission or reception procedure of data in BWP i is not completed, the base station and the terminal may change the operation BWP from BWP i to BWP j, and may perform a transmission or reception procedure of new data in BWP j.

In this case, the terminal may expect that the downlink communication procedure suspended in BWP i is to be resumed after the new data transmission or reception procedure is completed in BWP j. Thus, the terminal may maintain the data (e.g., soft bits, LLR values) stored in the soft buffer and information (e.g., HARQ process ID, RV, NDI) for resuming the data transmission/reception procedure without discarding. When the transmission or reception procedure in BWP j is completed, the base station and the terminal may change the operation BWP from BWP j to BWP and perform the suspended transmission or reception procedure of the data in BWP i. Here, $T_{DL,3}$, $T_{DL,4}$, $T_{DL,5}$, $T_{DL,6}$, $T_{DL,7}$, $T_{DL,8}$, $T_{DL,9}$, $T_{DL,10}$ and $T_{DL,11}$ may correspond to $T_{DL,3}$, $T_{DL,4}$, $T_{DL,5}$, $T_{DL,6}$, $T_{DL,7}$, $T_{DL,8}$, $T_{DL,9}$, $T_{DL,10}$ and $T_{DL,11}$ in FIG. 5, respectively.

The uplink communication procedure shown in FIG. 17B may be performed in the same or similar manner as the uplink communication procedure shown in FIG. 16. The base station and the terminal may change the operation BWP at the time point configured by the base station or at a preconfigured time. For example, even when the communication node changes the operation BWP from BWP i to BWP j and the transmission or reception procedure of data in BWP i is not completed, the base station and the terminal may change the operation BWP from BWP i to BWP j, and may perform a transmission or reception procedure of new data in BWP j.

In this case, the terminal may expect that the uplink communication procedure suspended in BWP i is to be resumed after the new data transmission or reception procedure is completed in BWP j. Thus, the terminal may maintain the data (e.g., soft bits, LLR values) stored in the soft buffer and information (e.g., HARQ process ID, RV, NDI) for resuming the data transmission/reception procedure without discarding. When the transmission or reception procedure in BWP j is completed, the base station and the terminal may change the operation BWP from BWP j to BWP i, and perform the suspended transmission or reception procedure of the data in BWP i. Here, $T_{UL,5}$, $T_{UL,6}$, $T_{UL,7}$, $T_{UL,8}$, $T_{UL,9}$, $T_{UL,10}$, $T_{UL,11}$, $T_{UL,12}$ and $T_{UL,13}$ may correspond to $T_{UL,5}$, $T_{UL,6}$, $T_{UL,7}$, $T_{UL,8}$, $T_{UL,9}$, $T_{UL,10}$, $T_{UL,11}$, $T_{UL,12}$ and $T_{UL,13}$ in FIG. 6, respectively.

On the other hand, according to the BWP changing method 3 described above, the reliability of the communication system may not be deteriorated. However, since the data retransmission procedure suspended in a specific BWP is resumed when the operation BWP of the communication node is changed (returned) to the previously operated BWP again, data transmission latency may occur, and the performance of the communication system may be degraded due to unnecessary data buffering operations.

When a switching cycle of BWP is short in the communication system, the BWP changing method 3 may be useful. The BWP switching cycle may be preconfigured between the base station and the terminal, and the base station and the terminal may change the operation BWP to the new BWP according to the BWP switching cycle.

Figure 18:
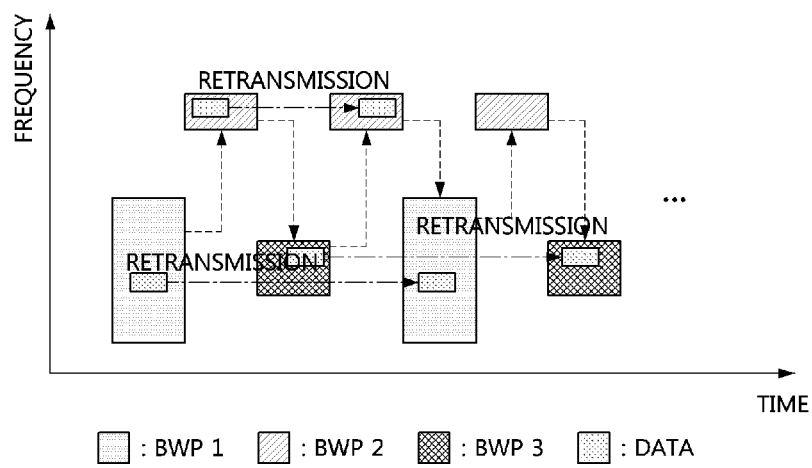
FIG. 18 is a conceptual diagram illustrating a first embodiment of a data (re)transmission procedure according to a BWP changing method 3 in a communication system.

FIG. 18 is a conceptual diagram illustrating a first embodiment of a data (re)transmission procedure according to a BWP changing method 3 in a communication system.

Referring to FIG. 18, a BWP in which a retransmission data is transmitted may be the same as a BWP in which an initial data is transmitted. For example, when data having a HARQ process 1 is initially transmitted in BWP 1, a retransmission procedure for the data may be performed in BWP 1 after the BWP changing procedure of (BWP 1→BWP 2→BWP 3→BWP 2→BWP 1) is performed. When data having a HARQ process 2 is initially transmitted in BWP 2, a retransmission procedure for the data may be performed in BWP 2 after the BWP changing procedure of (BWP 2→BWP 3→BWP 2) is performed. When data having a HARQ process 3 is initially transmitted in BWP 3, a retransmission procedure for the data may be performed in BWP 3 after the BWP changing procedure of (BWP 3→BWP 2→BWP 1→BWP 2→BWP 3) is performed.

If the retransmission procedure of the data is performed in the same BWP, a retransmission latency of the data may occur due to the BWP change. In order to solve this problem, it may be allowed to perform the retransmission procedure in a different BWP. For example, when there are common frequency resources in BWP 1 and BWP 3, a retransmission procedure for data initially transmitted in BWP 1 may be performed in BWP 3, and a retransmission procedure for data initially transmitted in BWP 3 may be performed in BWP 1. In this case, a retransmission latency of the data can be reduced.

Figure 19:
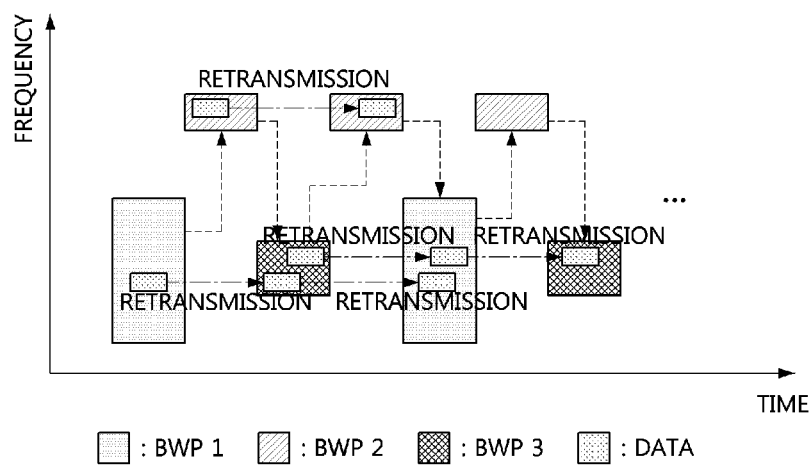
FIG. 19 is a conceptual diagram illustrating a second embodiment of a data (re)transmission procedure according to a BWP changing method 3 in a communication system.

FIG. 19 is a conceptual diagram illustrating a second embodiment of a data (re)transmission procedure according to a BWP changing method 3 in a communication system.

Referring to FIG. 19, when overlapping frequency resources (e.g., common frequency resources) exist between BWP 1 and BWP 3, a retransmission procedure for data initially transmitted in BWP 1 may be performed in BWP 3, and a retransmission procedure for data initially transmitted in BWP 3 may be performed in BWP 1.

To this end, the base station may transmit to the terminal information indicating that a retransmission procedure for data initially transmitted in BWP 1 is performed in BWP 3 (e.g., information indicating resources allocated for the data retransmission in BWP 3) or information indicating that a retransmission procedure for data initially transmitted in BWP 3 is performed in BWP 1 (e.g., information indicating resources allocated for the data retransmission in BWP 1) through at least one of an RRC message, a MAC CE, and a downlink control channel. The terminal may perform a data retransmission procedure in a different BWP based on the information received from the base station.

The terminal may decode a DCI according to a control channel element (CCE) aggregation level by performing blind decoding on a downlink control channel. When a plurality of BWPs is used in the communication system, different control channel regions may be configured in the respective BWPs. For example, a control resource set (CORESET) configured in BWP 1 may be different from a CORESET configured in BWP 3. When it is allowed to perform a data retransmission procedure in a different BWP, the terminal may receive a downlink control channel to receive information (e.g., resource allocation information)

for retransmission of downlink data or information (e.g., resource allocation information) for retransmission of uplink data.

In this case, the base station may transmit the downlink control channel including the information (e.g., resource allocation information) for retransmission of downlink data or the information (e.g., resource allocation information) for retransmission of uplink data by using common frequency resources between BWP 1 and BWP 3. Therefore, the base station may configure the terminal to perform blind decoding on the common frequency resources between BWP 1 and BWP 3. For example, the base station may preconfigure a resource region (e.g., common frequency resources between BWP 1 and BWP 3) on which the blind decoding is performed, and may transmit information indicating the preconfigured resource region to the terminal through at least one of an RRC message, a MAC CE, and a downlink control channel.

Also, a separate CCE aggregation level may be configured for the embodiment shown in FIG. 19 (e.g., an embodiment in which a data retransmission procedure is performed in a different BWP). The CCE aggregation level for the embodiment shown in FIG. 19 may be configured differently from a CCE aggregation level for the embodiment shown in FIG. 18, a CCE aggregation level for the embodiment according to the BWP changing method 1, and a CCE aggregation level for the embodiment according to the BWP changing method 2. The base station may inform the terminal of the CCE aggregation level for the embodiment shown in FIG. 19 through at least one of an RRC message, a MAC CE, and a downlink control channel. The terminal may perform blind decoding on the common resources between the BWPs using the CCE aggregation level configured by the base station.

Meanwhile, an uplink control channel (e.g., an uplink control channel through which a HARQ response and/or channel state information is transmitted) may exist in a BWP used for uplink data transmission. In this case, the same uplink data channel configured in two BWPs may be configured and operated as an uplink control channel. Alternatively, a specific region within the BWP may be configured and operated as an uplink control channel regardless of the BWP configuration. Alternatively, the terminal may transmit uplink control information together with uplink data through the uplink data channel.

1.1.4 BWP Changing Method 4

Not only when the transmission or reception of data is completed at the time of BWP change but also when the transmission or reception of data is not completed at the time of BWP change, the communication node (e.g., base station and terminal) may change the operation BWP (e.g., BWP 1) to the new BWP (e.g., BWP k). When the transmission or reception of the data is completed in BWP 1, the communication node may perform a transmission or reception procedure of new data in BWP k. On the other hand, when the transmission or reception of the data is not completed in BWP 1, the communication node may continuously perform the transmission or reception procedure of the data of the previously operated BWP (i.e., BWP 1) in the new (current) operation BWP (i.e., BWP k).

Figure 20A:
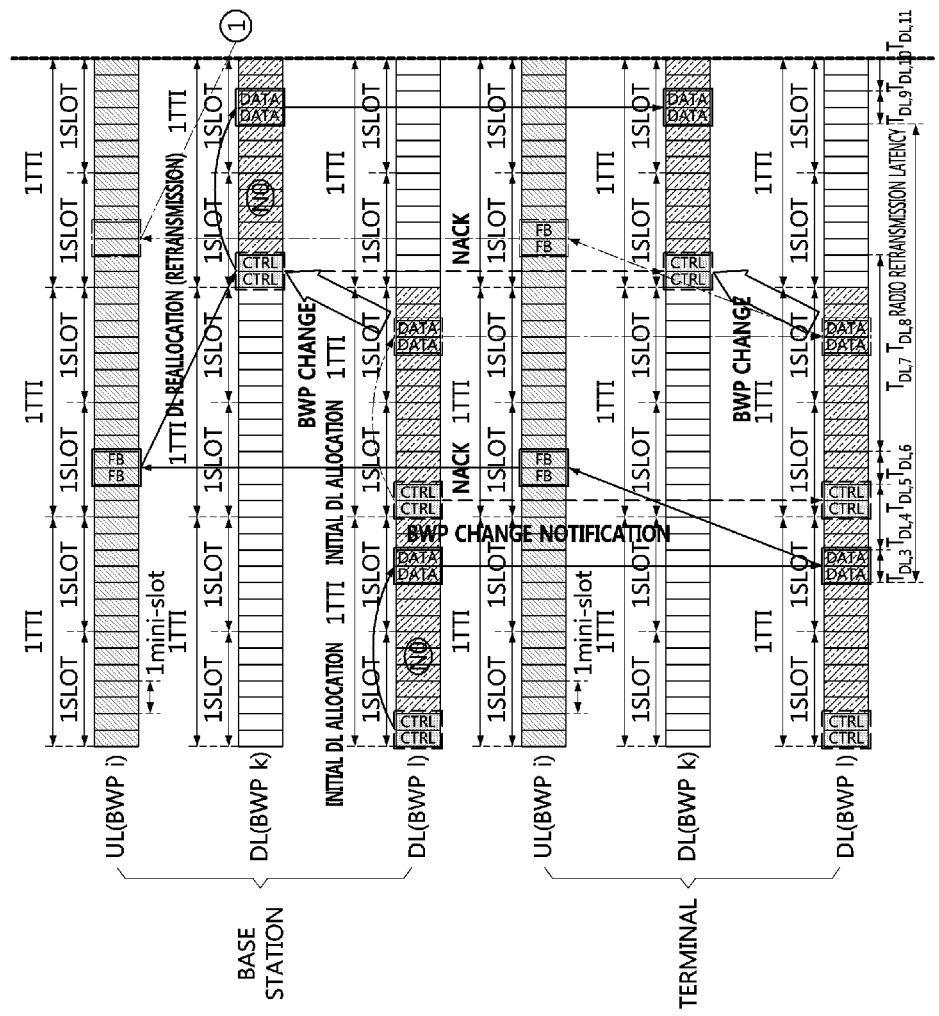
FIGS. 20A and 20B are conceptual diagrams illustrating a first embodiment of a downlink communication procedure according to a BWP changing method 4 in an FDD communication system.
Figure 20B:
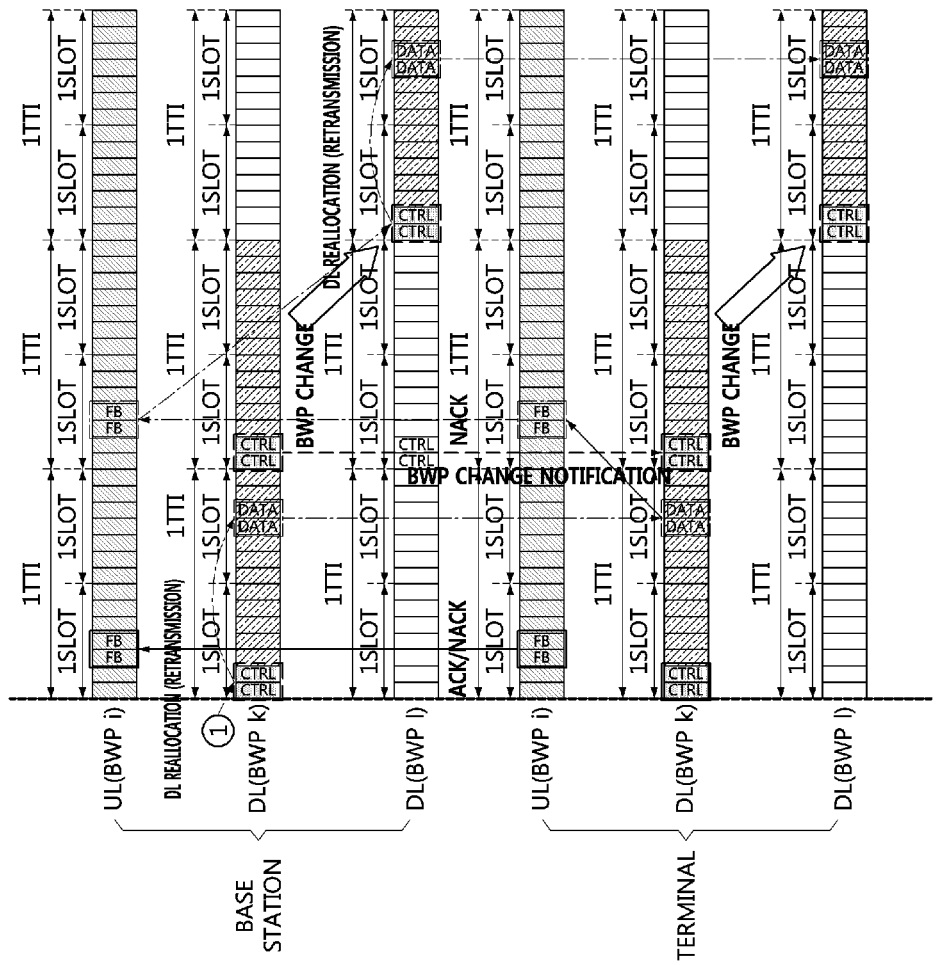

FIGS. 20A and 20B are conceptual diagrams illustrating a first embodiment of a downlink communication procedure according to a BWP changing method 4 in an FDD communication system.

Referring to FIGS. 20A and 20B, BWP i may be a UL BWP, and BWPs k and 1 may be DL BWPs. Each of BWPs i, k, and 1 may be a different BWP. In the time axis, the last slots shown in FIG. 20A may be contiguous with the starting slots shown in FIG. 20B. That is, the resource allocation information for retransmission according to the FB (e.g., NACK) indicated by ① in FIG. 20A may be transmitted through the control channel (CTRL) indicated by ① in FIG. 20B. $T_{DL,3}$, $T_{DL,4}$, $T_{DL,5}$, $T_{DL,6}$, $T_{DL,7}$, $T_{DL,8}$, $T_{DL,9}$, $T_{DL,10}$ and $T_{DL,11}$ may correspond to $T_{DL,3}$, $T_{DL,4}$, $T_{DL,5}$, $T_{DL,6}$, $T_{DL,7}$, $T_{DL,8}$, $T_{DL,9}$, $T_{DL,10}$ and $T_{DL,11}$ in FIG. 5, respectively. The base station and the terminal may perform downlink communication in BWP 1. When a BWP change from BWP 1 to BWP k is required, the base station may transmit BWP change information indicating the change from BWP 1 to BWP k through at least one of an RRC message, a MAC CE, and a downlink control channel. For example, BWP change information may be included in a DCI format 1_1.

The BWP change information may include one or more parameter(s) among a BWP change notification, a BWP changing point, and information indicating a new BWP (e.g., BWP ID, BWP index, bitmap, BWP change pattern). Also, the BWP change information may further include resource allocation information for data (re)transmission in the new BWP.

The terminal may receive the BWP change information from the base station by monitoring the downlink control channel, and may identify that the change of the operation BWP (e.g., change from BWP 1 to BWP k) is requested based on the BWP change information. Also, the terminal may identify the BWP changing point and the resource allocation information in BWP k based on the BWP change information. When the BWP change information is received, the terminal may transmit a response (e.g., ACK or NACK) for the BWP change information to the base station. When the positive response (i.e., ACK) for the BWP change information is received from the terminal, the base station may determine that the BWP change information is successfully received at the terminal. When the base station does not receive the positive response (i.e., ACK), receives the negative response (i.e., NACK), or does not receive the response for the BWP change information from the terminal within a predetermined time, the base station may assume that the BWP change information is not received at the terminal. In this case, the base station may request the BWP change by retransmitting the BWP change information or transmitting new BWP change information to the terminal. Meanwhile, when a plurality of BWP change information is received, the terminal may change the BWP based on the information indicated by the latest BWP change information.

The base station and the terminal may change the operation BWP at the time point configured by the base station or at a preconfigured time. For example, when the communication node changes the operation BWP from BWP 1 to BWP k and the transmission or reception procedure of the data is completed in BWP 1 at the time of the BWP change, the base station and the terminal may perform a transmission or reception procedure of new data in BWP k. On the other hand, when the transmission or reception procedure of the data is not completed in BWP 1 at the time of the BWP change, the base station and the terminal may continuously perform the transmission or reception procedure of the data of the previously operated BWP (e.g., BWP 1) in the new (current) operating BWP (e.g., BWP k), and perform a transmission or reception procedure of new data in BWP k after the transmission or reception procedure of the corresponding data is completed.

In this case, the terminal may expect the transmission or reception procedure of the data of the previously operated BWP (e.g., BWP 1) to be performed continuously in the new (current) operating BWP (e.g., BWP k). Therefore, the terminal may maintain the data stored in the soft buffer (e.g., the data received in the transmission or reception procedure of the data of BWP 1) after the BWP changing point and information (e.g., HARQ process ID, RV, NDI) for performing continuously the data transmission/reception procedure without discarding. Here, the transmission or reception procedure of the data of the previously operated BWP (e.g., BWP 1) may be performed using resources in the new (current) operation BWP (e.g., BWP k), which are indicated by the BWP change information or configured by the base station.

Figure 21:
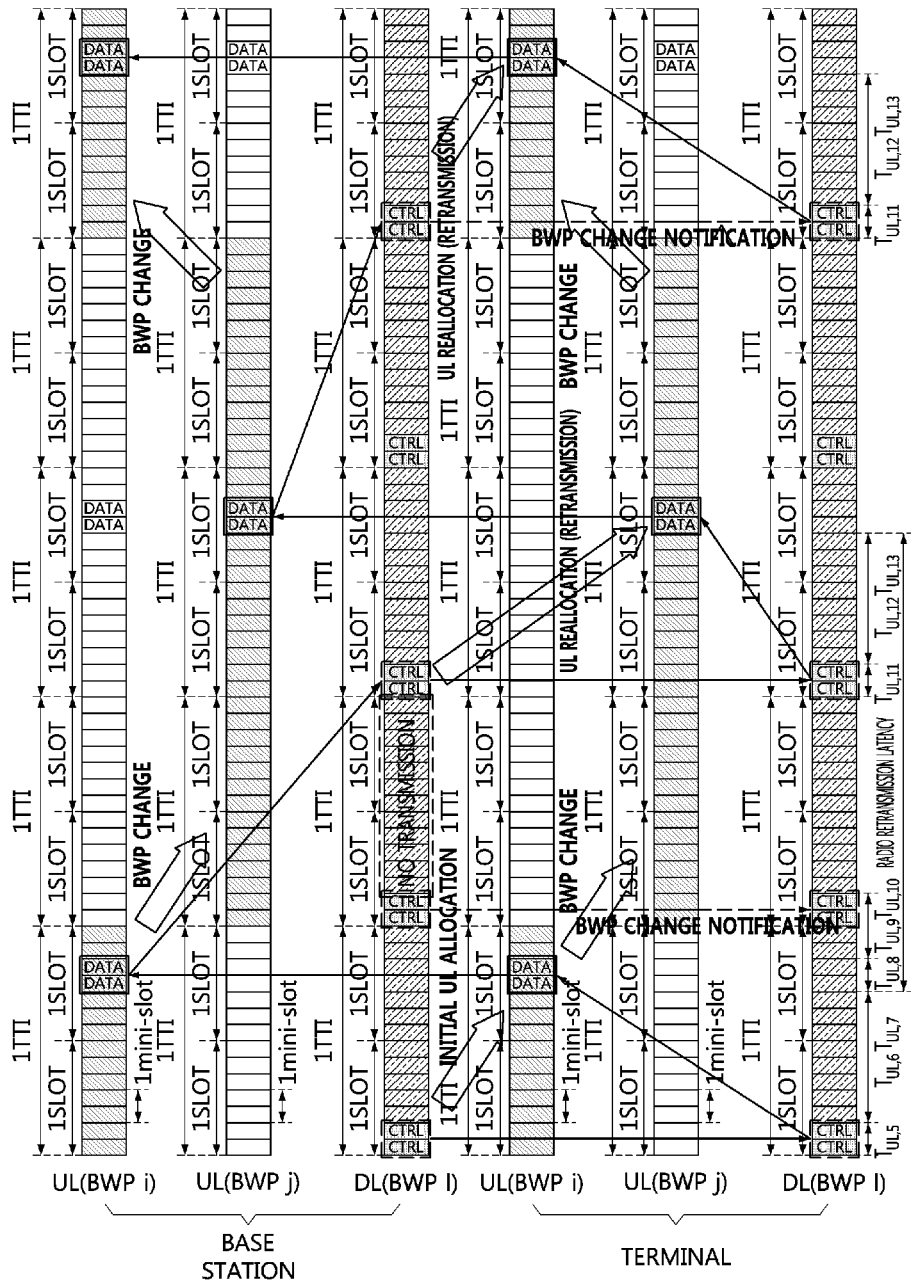
FIG. 21 is a conceptual diagram illustrating a first embodiment of an uplink communication procedure according to a BWP changing method 4 in an FDD communication system.

FIG. 21 is a conceptual diagram illustrating a first embodiment of an uplink communication procedure according to a BWP changing method 4 in an FDD communication system.

Referring to FIG. 21, BWPs i and j may be UL BWPs, and BWP l may be a DL BWP. Each of BWPs i, j, and l may be a different BWP. $T_{UL,5}$, $T_{UL,6}$, $T_{UL,7}$, $T_{UL,8}$, $T_{UL,9}$, $T_{UL,10}$, $T_{UL,11}$, $T_{UL,12}$ and $T_{UL,13}$ may correspond to $T_{UL,5}$, $T_{UL,6}$, $T_{UL,7}$, $T_{UL,8}$, $T_{UL,9}$, $T_{UL,10}$, $T_{UL,11}$, $T_{UL,12}$ and $T_{UL,13}$ in FIG. 6, respectively. The base station and the terminal may perform uplink communication in BWP i. When a BWP change from BWP i to BWP j is required, the base station may transmit BWP change information indicating the change from BWP i to BWP j through at least one of an RRC message, a MAC CE, and a downlink control channel.

The BWP change information may include one or more parameter(s) among a BWP change notification, a BWP changing point, and information indicating a new BWP (e.g., BWP ID, BWP index, bitmap, BWP change pattern). Also, the BWP change information may further include resource allocation information (resource allocation information for a HARQ response) for data (re)transmission in the new BWP. For example, the BWP change information may be included in a DCI format 1_1.

The terminal may receive the BWP change information from the base station by monitoring the downlink control channel, and may identify that the change of the operation BWP (e.g., change from BWP i to BWP j) is requested based on the BWP change information. Also, the terminal may identify the BWP changing point and the resource allocation information in the new BWP based on the BWP change information. When the BWP change information is received, the terminal may transmit a response (e.g., ACK or NACK) for the BWP change information to the base station. When the positive response (i.e., ACK) for the BWP change information is received from the terminal, the base station may determine that the BWP change information is successfully received at the terminal. When the base station does not receive the positive response (i.e., ACK), receives the negative response (i.e., NACK), or does not receive the response for the BWP change information from the terminal within a predetermined time, the base station may assume that the BWP change information is not received at the terminal. In this case, the base station may request the BWP change by retransmitting the BWP change information or transmitting new BWP change information to the terminal. Meanwhile, when a plurality of BWP change information is received, the terminal may change the BWP based on the information indicated by the latest BWP change information.

The base station and the terminal may change the operation BWP at the time point configured by the base station or at a preconfigured time. For example, when the communication node changes the operation BWP from BWP i to BWP j and the transmission or reception procedure of the data is completed in BWP i at the time of the BWP change, the base station and the terminal may perform a transmission or reception procedure of new data in BWP j. On the other hand, when the transmission or reception procedure of the data is not completed in BWP i at the time of the BWP change, the base station and the terminal may continuously perform the transmission or reception procedure of the data of the previously operated BWP (e.g., BWP i) in BWP j, and perform a transmission or reception procedure of new data in the new (current) operation BWP (e.g., BWP j) after the transmission or reception procedure of the corresponding data is completed.

In this case, the base station may expect the transmission or reception procedure of the data of the previously operated BWP (e.g., BWP i) to be performed continuously in the new (current) BWP (e.g., BWP j). Therefore, the base station may maintain the data stored in the soft buffer (e.g., the data received in the transmission or reception procedure of the data of BWP i) after the BWP changing point without discarding. Also, the base station may maintain information (e.g., HARQ process ID, RV, NDI) for performing continuously the resource allocation procedure for the retransmission data and the data retransmission procedure (e.g., transmission/reception procedure of retransmission data) without discarding. For performing continuously the data transmission/reception procedure, the terminal may maintain the retransmission data stored in the soft buffer and information (e.g., HARQ process ID, RV, NDI) for retransmission data without discarding. Here, the transmission or reception procedure of the data of the previously operated BWP (e.g., BWP i) may be performed using resources in the new operating BWP (e.g., BWP j), which are indicated by the BWP change information or configured by the base station.

Figure 22:
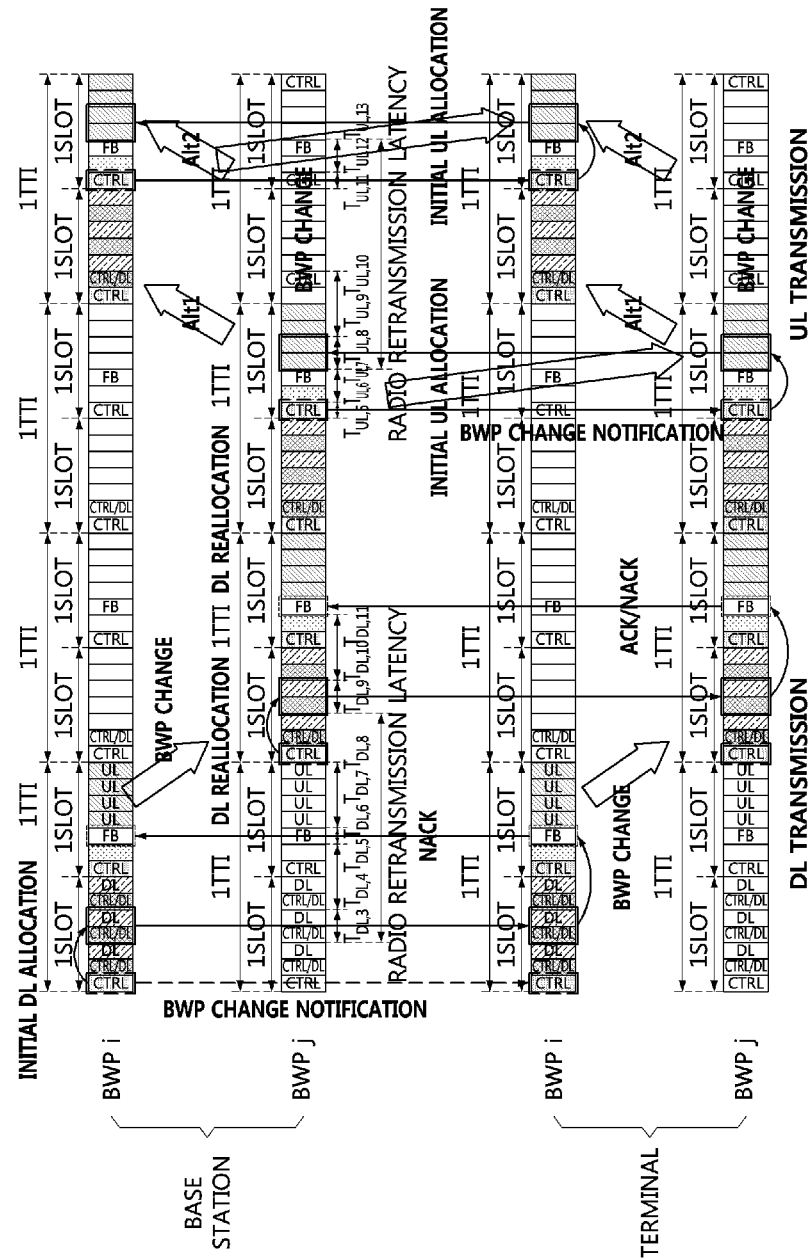
FIG. 22 is a conceptual diagram illustrating a first embodiment of downlink and uplink communication procedures according to a BWP changing method 4 in a TDD communication system.

FIG. 22 is a conceptual diagram illustrating a first embodiment of downlink and uplink communication procedures according to a BWP changing method 4 in a TDD communication system.

Referring to FIG. 22, a subframe may be an SC subframe. A structure of a frame (e.g., subframe) may be determined according to transmission of a downlink control/data channel, configuration of downlink data, and configuration of uplink data. Each of BWPs i and j may be a different BWP.

The downlink communication procedure shown in FIG. 22 may be performed in the same or similar manner as the downlink communication procedure shown in FIG. 20A. The base station and the terminal may change the operation BWP at the time point configured by the base station or at a preconfigured time. For example, when the communication node changes the operation BWP from BWP i to BWP j and the transmission or reception procedure of the data is completed in BWP i at the time of the BWP change, the base station and the terminal may perform a transmission or reception procedure of new data in BWP j. On the other hand, when the transmission or reception procedure of the data is not completed in BWP i at the time of the BWP change, the base station and the terminal may continuously perform the transmission or reception procedure of the data of the previously operated BWP (e.g., BWP i) in the new (current) operating BWP (e.g., BWP j), and perform a transmission or reception procedure of new data in BWP j after the transmission or reception procedure of the corresponding data is completed. Here, $T_{DL,3}$, $T_{DL,4}$, $T_{DL,5}$, $T_{DL,6}$, $T_{DL,7}$, $T_{DL,8}$, $T_{DL,9}$, $T_{DL,10}$ and $T_{DL,11}$ may correspond to $T_{DL,3}$, $T_{DL,4}$, $T_{DL,5}$, $T_{DL,6}$, $T_{DL,7}$, $T_{DL,8}$, $T_{DL,9}$, $T_{DL,10}$ and $T_{DL,11}$ in FIG. 5, respectively.

The uplink communication procedure shown in FIG. 22 may be performed in the same or similar manner as the uplink communication procedure shown in FIG. 21. The base station and the terminal may change the operation BWP at the time point configured by the base station or at a preconfigured time. For example, when the communication node changes the operation BWP from BWP j to BWP i and the transmission or reception procedure of the data is completed in BWP j at the time of the BWP change, the base station and the terminal may perform a transmission or reception procedure of new data in BWP i. On the other hand, when the transmission or reception procedure of the data is not completed in BWP j at the time of the BWP change, the base station and the terminal may continuously perform the transmission or reception procedure of the data of the previously operated BWP (e.g., BWP j) in the new (current) operating BWP (e.g., BWP i), and perform a transmission or reception procedure of new data in BWP i after the transmission or reception procedure of the corresponding data is completed.

Meanwhile, the data transmission latency according to the BWP changing method 4 described above may be the same as the data transmission latency in the embodiment in which the BWP is not changed.

1.2 BWP Change Indication Method 1.2.1 BWP Changing Method Based on Downlink Control Channel The BWP change information may be transmitted using at least one of an RRC message, a MAC CE, or a downlink control channel from the base station to the terminal. The BWP change information may include one or more parameter(s) among a BWP change notification, a BWP changing point, information indicating a new BWP (e.g., BWP ID, BWP index, bitmap, BWP change pattern), and resource allocation information for data (re)transmission in the new BWP.

The terminal may receive the BWP change information from the base station and may perform the BWP change operation based on the information elements included in the BWP change information. For example, the terminal may perform the BWP change operation at the BWP changing point indicated by the BWP change information. Alternatively, the terminal may perform the BWP change operation immediately after receiving the BWP change information. Alternatively, when the BWP change information includes the BWP change pattern, the terminal may perform the BWP change operation according to the BWP change pattern.

The base station and the terminal may transmit and receive data using the resources indicated by the resource allocation information included in the BWP change information after changing the operation BWP to the new BWP. Alternatively, the base station and the terminal may transmit and receive data using the resources allocated in the previously operated BWP after changing the operation BWP to the new BWP. When the downlink control channel including the BWP change information is received, the terminal may transmit an HARQ response (e.g., ACK or NACK) for the BWP change information to the base station. The base station may receive the HARQ response from the terminal, and identify whether the BWP change information is successfully received at the terminal based on the HARQ response. When the base station does not receive the positive response (i.e., ACK), receives the negative response (i.e., NACK), or does not receive the response for the BWP change information from the terminal within a predetermined time, the base station may assume that the BWP change information is not received at the terminal. In this case, the base station may request the BWP change by retransmitting the BWP change information or transmitting new BWP change information to the terminal. Meanwhile, when a plurality of BWP change information is received, the terminal may change the BWP based on the information indicated by the latest BWP change information.

1.2.2 BWP Changing Method Based on Timer

A timer for BWP change may be configured, and the communication node (e.g., base station and terminal) may change the operation BWP to the new BWP when the timer expires. Such the timer-based BWP changing method may be performed as follows.

Step 0: Initial configurations and basic conditions
   The base station may transmit a message (e.g., an RRC message or a message including a MAC CE) including an inactive timer value to the terminal. The inactive timer value may be set before the BWP change.
   The terminal may set an inactive timer value configured by the base station and an internal timer value of the terminal to an initial value (e.g., 0).
   The terminal may receive a downlink control channel form the base station.
Step 1: The terminal may receive the downlink control channel in the current BWP.
   Step 1-1: When a DCI including the BWP change information is not received, the terminal may increase the internal timer value.
   Step 1-2: When a DCI including the BWP change information is received, the terminal may maintain or initialize the internal timer value.
Step 2: The terminal may check whether the internal timer has expired.
   Step 2-1: If the incremented internal timer value in Step 1-1 is equal to the inactive timer value (e.g., when the internal timer expires), the terminal may change the operation BWP to the previously operated BWP or the default (or dedicated) BWP.
   Step 2-2: If the incremented internal timer value in Step 1-1 is different from the inactive timer value (e.g., when the internal timer is valid), the terminal may return to Step 1.

According to the timer-based BWP changing method described above, the terminal may identify whether BWP change information is included in a downlink control channel by receiving the downlink control channel every time. That is, since the terminal always receives the downlink control channel, the load of the terminal may increase. In order to solve this problem, the terminal may set a frame number (e.g., a previous frame number or a new frame number) to the inactive timer value at the time of change of a frame (e.g., frame number). The terminal may change the operation BWP to the previously operated BWP or the default BWP when the current frame number is equal to the inactive timer value. Alternatively, the terminal may return to Step 1 when the current frame number is different from the inactive timer value.

1.3 BWP Operating Method

In a specific BWP, sidelink communication may be performed instead of downlink/uplink communication, in which case the transmission latency of data in the communication system may be reduced. A BWP, a frame structure, and related parameters (e.g., subcarrier spacing, bandwidth, number of resource blocks (RBs)) for sidelink communication may be configured. The configuration information for the sidelink communication may be applied to a connection or termination procedure of the sidelink communication after BWP change and a BWP changing procedure in the sidelink communication.

The BWP change information may include the configuration information (e.g., BWP for sidelink communication, frame structure, and related parameters) for sidelink communication. The configuration information for the sidelink communication may be transmitted using at least one of an RRC message, a MAC CE, and a downlink control channel.

The BWP configured in an unlicensed band may be divided into one or more sub-BWPs, and the terminal may perform a clear channel assessment (CCA) operation in each of one or more sub-BWPs. The terminal may determine a sub-BWP capable of data transmission based on the result of the CCA operation, change the operation BWP to the determined sub-BWP, and perform a data transmission or reception procedure in the changed sub-BWP. The BWP change information may include configuration information (e.g., BWP on which the CCA is to be performed, data structure, and related parameters (e.g., subcarrier spacing, bandwidth, number of RBs)) for the CCA. The configuration information for the CCA may be transmitted using at least one of an RRC message, a MAC CE, and a downlink control channel.

Meanwhile, in the communication system, the base station may transmit a synchronization block/physical broadcast channel (SS/PBCH) block in a specific BWP. The terminal may receive the SS/PBCH block in the specific BWP, and obtain synchronization information and system information based on the SS/PBCH block. Here, the SS/PBCH block may be transmitted and received as follows.

Figure 23A:
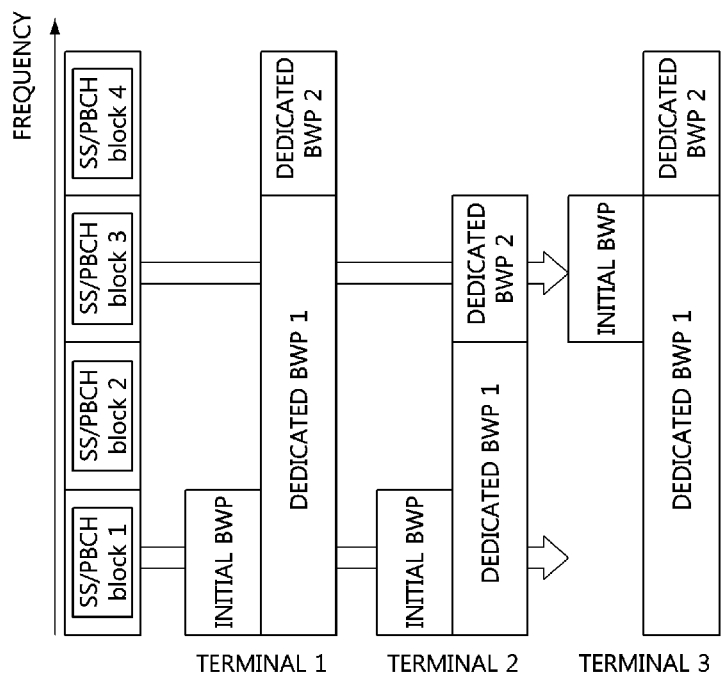
FIG. 23A is a conceptual diagram illustrating a first embodiment of a method of transmitting and receiving an SS/PBCH block in a communication system.

FIG. 23A is a conceptual diagram illustrating a first embodiment of a method of transmitting and receiving an SS/PBCH block in a communication system.

Referring to FIG. 23A, a terminal 1 may perform a connection establishment procedure with a base station in an initial BWP, and dedicated BWPs 1 and 2 for the terminal 1 may be configured when the connection establishment procedure between the terminal 1 and the base station is completed. The terminal 1 may receive an SS/PBCH block 1 from the base station in the initial BWP.

A terminal 2 may perform a connection establishment procedure with the base station in an initial BWP, and dedicated BWPs 1 and 2 for the terminal 2 may be configured when the connection establishment procedure between the terminal 2 and the base station is completed. The frequency band of the initial BWP of the terminal 2 may be the same as the frequency band of the initial BWP of the terminal 1. The terminal 2 may receive an SS/PBCH block 1 from the base station in the initial BWP.

A terminal 3 may perform a connection establishment procedure with the base station in an initial BWP, and dedicated BWPs 1 and 2 for the terminal 3 may be configured when the connection establishment procedure between the terminal 3 and the base station is completed. The frequency band of the initial BWP of the terminal 3 may be different from the frequency band of the initial BWP of the terminals 1 and 2. The terminal 3 may receive an SS/PBCH block 3 from the base station in the initial BWP.

When the initial BWPs of the terminals are different, the base station may redundantly transmit SS/PBCH blocks including similar information through different BWPs. In order to solve this problem, SS/PBCH blocks may be transmitted and received as follows.

Figure 23B:
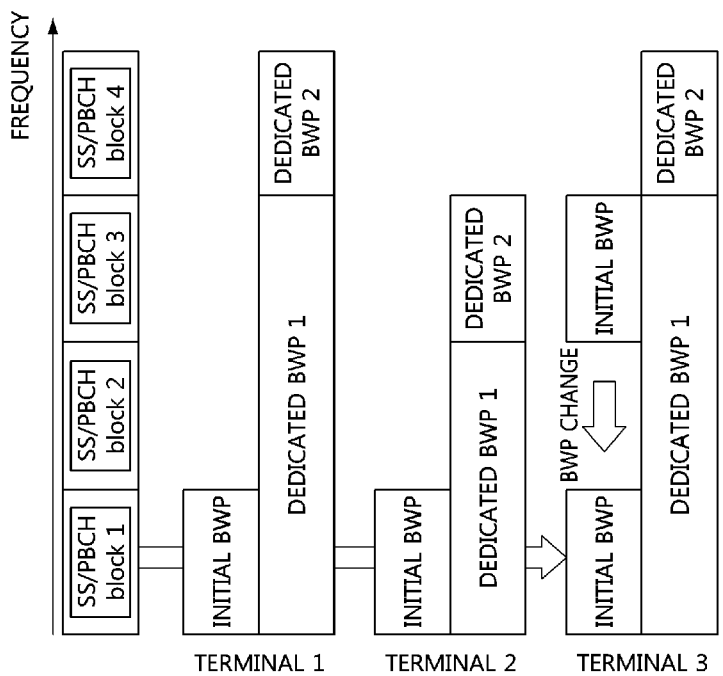
FIG. 23B is a conceptual diagram illustrating a second embodiment of a method of transmitting and receiving an SS/PBCH block in a communication system.

FIG. 23B is a conceptual diagram illustrating a second embodiment of a method of transmitting and receiving an SS/PBCH block in a communication system.

Referring to FIG. 23B, when the frequency band of the initial BWP of the terminal 3 is different from the frequency band of the initial BWP of the terminal 1 and the frequency band of the initial BWP of the terminal 2, the base station may transmit BWP change information instructing to change the initial BWP to the terminal 3. The BWP change information may instruct the initial BWP of the terminal 3 to be changed to the initial BWP of the terminal 1 or the terminal 2. The terminal 3 may receive the BWP change information from the base station, and change the initial BWP of the terminal 3 to the initial BWP of the terminal 1 or the terminal 2 based on the BWP change information.

When the initial BWP of the terminal 3 is changed, the base station may transmit the SS/PBCH block 1 to the terminals 1 to 3 through the same frequency band (e.g., the initial BWP), and the terminals 1 to 3 may receive the SS/PBCH block 1 from the base station through the same frequency band (e.g., the initial BWP).

Meanwhile, when a plurality of BWPs is used in the communication system supporting sidelink communication or unlicensed band communication (e.g., licensed-assisted access (LAA), NR-based access to unlicensed spectrum (NR-U)) communication, a new BWP in the BWP changing procedure may be indicated as follows.

Figure 24:
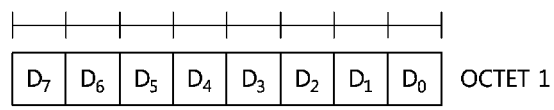
FIG. 24 is a conceptual diagram illustrating a first embodiment of a bitmap indicating a new BWP in a communication system.

FIG. 24 is a conceptual diagram illustrating a first embodiment of a bitmap indicating a new BWP in a communication system.

Referring to FIG. 24, in the BWP changing procedure, the base station may transmit BWP change information including a bitmap indicating a new BWP to the terminal. The size of the bitmap may be greater than or equal to one octet, and each of the bits included in the bitmap may be matched to one BWP. For example, when 8 BWPs are used in the communication system, $D_0$, $D_1$, $D_2$, $D_3$, $D_4$, $D_5$, $D_6$, and $D_7$ may be mapped to BWP 1, BWP 2, BWP 3, BWP 4, BWP 5, BWP 6, BWP 7, and BWP 8, respectively. A bit set to '0' in the bitmap may indicate that the BWP mapped to the bit is inactive, and a bit set to '1' in the bitmap may indicate that the BWP mapped to the bit is activated.

For example, when it is required to change the operation BWP of the terminal to BWP 4, the base station may configure the bitmap as shown in Table 4 below, and transmit the BWP change information including the bitmap to the terminal.

TABLE 4

| $D_7$ | $D_6$ | $D_5$ | $D_4$ | $D_3$ | $D_2$ | $D_1$ | $D_0$ |
|---|---|---|---|---|---|---|---|
| 0 | 0 | 0 | 0 | 1 | 0 | 0 | 0 |

The terminal may receive the BWP change information from the base station, and identify that $D_3$ is set to '1' in the bitmap included in the BWP change information. In this case, the terminal may change the operation BWP to BWP 4 indicated by the bitmap, and perform a data transmission or reception procedure in BWP 4. The BWP changing point may be a time point indicated by the BWP change information or a time point preconfigured between the base station and the terminal. The BWP ID may be sorted according to a preconfigured rule (e.g., ascending order or descending order).

Figure 25:
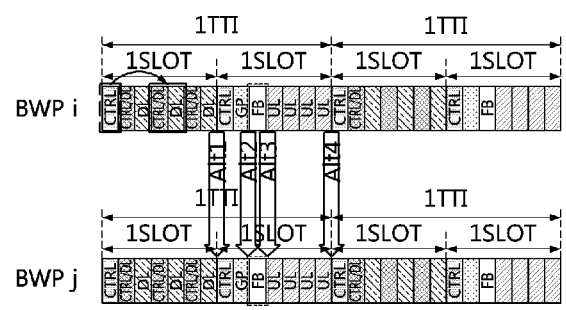
FIG. 25 is a conceptual diagram illustrating a first embodiment of a BWP changing point for downlink communication in a communication system.

1.4 BWP Switching Time 1.4.1 BWP Switching Time in Downlink Communication Procedure FIG. 25 is a conceptual diagram illustrating a first embodiment of a BWP changing point for downlink communication in a communication system.

Referring to FIG. 25, the base station may transmit 'resource allocation information for downlink data and BWP change information' or BWP change information to the terminal through a downlink control channel CTRL. The BWP change information may include BWP changing points (e.g., Alt 1, Alt 2, Alt 3, and Alt 4). When the BWP change information is received, the terminal may transmit a response (e.g., ACK or NACK) for the BWP change information to the base station. When the positive response (i.e., ACK) for the BWP change information is received from the terminal, the base station may determine that the BWP change information is successfully received at the terminal. The positive response (i.e., ACK) for the BWP change information may be transmitted in a previously operated BWP (e.g., BWP i) or a new operating BWP (e.g., BWP j). When the base station does not receive the positive response (i.e., ACK), receives the negative response (i.e., NACK), or does not receive the response for the BWP change information from the terminal within a predetermined time, the base station may assume that the BWP change information is not received at the terminal. In this case, the base station may request the BWP change by retransmitting the BWP change information or transmitting new BWP change information to the terminal. Meanwhile, when a plurality of BWP change information is received, the terminal may change the BWP based on the information indicated by the latest BWP change information.

Resource allocation information for the HARQ response (e.g., ACK or NACK) for the BWP change information may be transmitted through the downlink control channel together with the BWP change information. Alternatively, when the resource allocation information for downlink data and the BWP change information are transmitted through the downlink control channel, the HARQ response to the BWP change information may be substituted with an HARQ response to the downlink data. In this case, the HARQ response to the BWP change information may be omitted.

After the BWP change information is transmitted and received, the base station and the terminal may change the operation BWP from BWP i to BWP j at the following Alt 1, Alt 2, Alt 3, or Alt 4. The Alt 1, Alt 2, Alt 3, or Alt 4 may be indicated by the BWP change information. Alternatively, Alt 1, Alt 2, Alt 3, or Alt 4 may be preconfigured between the base station and the terminal through an RRC signalling procedure. After transmitting and receiving the BWP change information, the base station and the terminal may change the operation BWP from BWP i to BWP j at the time of Alt 1, Alt 2, Alt 3, or Alt 4.

Alt 1: The BWP may be changed to a new BWP at a boundary of slot, subframe, or TTI (e.g., starting point of slot, subframe, or TTI). The base station may transmit information indicating that the BWP is to be changed at a boundary of slot, subframe, or TTI (e.g., starting point of slot, subframe, or TTI) to the terminal using at least one of an RRC message, a MAC CE, and a downlink control channel. For example, when a downlink control channel including the BWP change information is transmitted and received in a slot # n, a subframe # n, or a TTI # n, the base station and the terminal may change the operation BWP from BWP i to BWP j at the starting point of the subsequent slot # n+1, subframe # n+1, or TTI # n+1 after the slot # n, subframe # n, or TTI # n.

Alternatively, the base station and the terminal may change the operation BWP (e.g., BWP i) to a new BWP (e.g., BWP j) before transmission and reception of a downlink control channel including resource allocation information for uplink data. In this case, a downlink control channel transmitted in the new BWP (e.g., BWP j) may include resource allocation information for an HARQ response to the downlink data transmitted in the previously operated BWP (e.g., BWP i).

Alt 2: Radio frequency (RF) switching may be performed between downlink transmission and uplink transmission in a TDD (or unpaired spectrum) communication system. The BWP may be changed to a new BWP at an RF switching point. For example, the BWP may be changed to a new BWP at the starting point or ending point of the guard period (GP). The base station may transmit information indicating that the BWP is to be changed at the starting point or ending point of the GP to the terminal using at least one of an RRC message, a MAC CE, and a downlink control channel. An HARQ response to the downlink data transmitted in the previously operated BWP (e.g., BWP i) may be transmitted in the new operating BWP (e.g., BWP j). The resource allocation information for an HARQ response to the downlink data may be transmitted together with the BWP change information through the downlink control channel.

Alt 3: The BWP may be changed to a new BWP at the starting point of an uplink transmission period. For example, when an HARQ response FB for downlink data is transmitted in a previously operated BWP (e.g., BWP i) and an uplink transmission duration exists after the HARQ response FB for downlink data, the base station and the terminal may change the operation BWP from BWP i to BWP j at the starting point of the uplink transmission period.

The base station may transmit information indicating that the BWP is changed at the starting point of the uplink transmission period to the terminal using at least one of an RRC message, a MAC CE, and a downlink control channel. Also, resource allocation information for uplink data in the new operating BWP (e.g., BWP j) may be transmitted through the downlink control channel in the previously operated BWP (e.g., BWP i).

Alt 4: The BWP may be changed to a new BWP at a boundary of slot, subframe, or TTI (e.g., starting point of slot, subframe, or TTI). The base station may transmit information indicating that the BWP is to be changed at a boundary of slot, subframe, or TTI (e.g., starting point of slot, subframe, or TTI) to the terminal using at least one of an RRC message, a MAC CE, and a downlink control channel. Here, the BWP may be changed after a slot, subframe, or TTI including an uplink transmission period.

For example, when the downlink control channel including the BWP change information is transmitted and received in a slot # n, subframe # n, or TTI # n, and the uplink transmission period belongs to a slot # n+1, subframe # n+1, or TTI # n+1, the base station and the terminal may change the operation BWP from BWP i to BWP j at the starting point of the slot # n+2, subframe # n+2, or TTI # n+2. An HARQ response to uplink data transmitted in the previously operated BWP (e.g., BWP i) may be transmitted in the new operating BWP (e.g., BWP j).

1.4.2 BWP Switching Time in Uplink Communication Procedure

Figure 26:
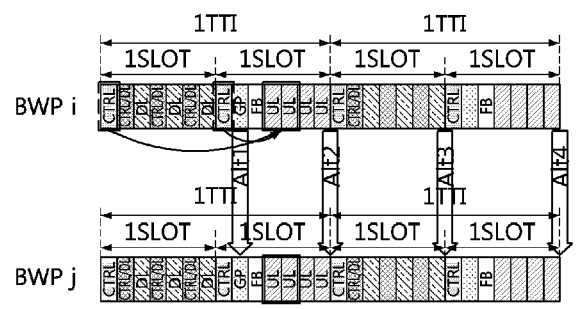
FIG. 26 is a conceptual diagram illustrating a first embodiment of a BWP changing point for uplink communication in a communication system.

FIG. 26 is a conceptual diagram illustrating a first embodiment of a BWP changing point for uplink communication in a communication system.

Referring to FIG. 26, the base station may transmit 'resource allocation information for uplink data and BWP change information' or BWP change information to the terminal through a downlink control channel CTRL. The BWP change information may include BWP changing points (e.g., Alt 1, Alt 2, Alt 3, and Alt 4). When the BWP change information is received, the terminal may transmit a response (e.g., ACK or NACK) for the BWP change information to the base station. When the positive response (i.e., ACK) for the BWP change information is received from the terminal, the base station may determine that the BWP change information is successfully received at the terminal. When the base station does not receive the positive response (i.e., ACK), receives the negative response (i.e., NACK), or does not receive the response for the BWP change information from the terminal within a predetermined time, the base station may assume that the BWP change information is not received at the terminal. In this case, the base station may request the BWP change by retransmitting the BWP change information or transmitting new BWP change information to the terminal. Meanwhile, when a plurality of BWP change information is received, the terminal may change the BWP based on the information indicated by the latest BWP change information.

An HARQ response to the BWP change information may be transmitted in a previously operated BWP (e.g., BWP i) or a new operating BWP (e.g., BWP j). Resource allocation information for the HARQ response (e.g., ACK or NACK) for the BWP change information may be transmitted together with the BWP change information through the downlink control channel. Alternatively, when the resource allocation information for uplink data and the BWP change information are transmitted through the downlink control channel, the HARQ response to the BWP change information may be substituted with an HARQ response to the uplink data. In this case, the HARQ response to the BWP change information may be omitted.

After the BWP change information is transmitted and received, the base station and the terminal may change the operation BWP from BWP i to BWP j at the following Alt 1, Alt 2, Alt 3, or Alt 4. The Alt 1, Alt 2, Alt 3, or Alt 4 may be indicated by the BWP change information. Alternatively, Alt 1, Alt 2, Alt 3, or Alt 4 may be preconfigured between the base station and the terminal through an RRC signalling procedure. After transmitting and receiving the BWP change information, the base station and the terminal may change the operation BWP from BWP i to BWP j at the time of Alt 1, Alt 2, Alt 3, or Alt 4.

Alt 1: RF switching may be performed between downlink transmission and uplink transmission in a TDD (or unpaired spectrum) communication system. The BWP may be changed to a new BWP at an RF switching point. For example, the BWP may be changed to a new BWP at the starting point or ending point of the GP. The base station may transmit information indicating that the BWP is to be changed at the starting point or ending point of the GP to the terminal using at least one of an RRC message, a MAC CE, and a downlink control channel. In this case, the base station and the terminal may change the operation BWP from BWP i to BWP j at the starting point or ending point of the GP, and perform the uplink communication procedure in BWP j. The resource allocation information for uplink data transmitted in BWP j may be transmitted through the downlink control channel in the previously operated BWP (e.g., BWP i).

Alt 2: The BWP may be changed to a new BWP at a boundary of slot, subframe, or TTI (e.g., starting point of slot, subframe, or TTI). The base station may transmit information indicating that the BWP is to be changed at a boundary of slot, subframe, or TTI (e.g., starting point of slot, subframe, or TTI) to the terminal using at least one of an RRC message, a MAC CE, and a downlink control channel.

For example, when a downlink control channel including resource allocation information for uplink data and the BWP change information is transmitted and received in a slot # n, subframe # n, or TTI # n, and the uplink data is transmitted using resources indicated by the resource allocation information in a slot # n+1, subframe # n+1, or TTI # n+1, the base station and the terminal may change the operation BWP from BWP i to BWP j at the starting point of a slot # n+2, subframe # n+2, or TTI # n+2 after the slot # n+1, subframe # n+1, or TTI # n+1. The base station and the terminal may perform an uplink communication procedure in BWP j.

Here, the base station may transmit resource allocation information for an HARQ response to uplink data received in BWP i or a retransmission procedure of uplink data failed to be received in BWP i through a downlink control channel in BWP j. Alternatively, the retransmission procedure of the uplink data failed to be received in BWP i may not be performed in BWP j.

Alt 3: When a downlink control channel including resource allocation information for retransmission of uplink data or an HARQ response to uplink data is transmitted in a previously operated BWP (e.g., BWP i), the corresponding downlink control channel may include resource allocation information for uplink data in a new operating BWP (e.g., BWP j). Alternatively, when a downlink control channel including resource allocation information for uplink data is transmitted in the new operating BWP (e.g., BWP j), the corresponding downlink control channel may include resource allocation information for retransmission of uplink data failed to be received in the previously operated BWP (e.g., BWP i).

Alt 4: The BWP may be changed to a new BWP at a boundary of slot, subframe, or TTI (e.g., starting point of slot, subframe, or TTI). The base station may transmit information indicating that the BWP is to be changed at a boundary of slot, subframe, or TTI (e.g., starting point of slot, subframe, or TTI) to the terminal using at least one of an RRC message, a MAC CE, and a downlink control channel. Here, the BWP may be changed at a starting point of a slot, subframe, or TTI after a slot, subframe, or TTI including an uplink transmission duration.

For example, when the downlink control channel including the BWP change information is transmitted and received in a slot # n, subframe # n, or TTI # n, and the uplink transmission period belongs to a slot # n+1, subframe # n+1, or TTI # n+1, the base station and the terminal may change the operation BWP from BWP i to BWP j at the starting point of the slot # n+2, subframe # n+2, or TTI # n+2. Here, the base station may transmit resource allocation information for an HARQ response to uplink data received in BWP i or a retransmission procedure of uplink data failed to be received in BWP i through a downlink control channel in BWP j.

1.5 Method for Determining Candidate BWP

For low latency and reliable data communications, the communication node (e.g., base station and terminal) may perform measurement/reporting procedures of the radio channel information on a target BWP to be changed or a candidate BWP. For example, the base station may manage the BWP that may be changed by the terminal performing communications in the currently operating BWP. Also, the base station may request the terminal to perform the measurement/reporting procedures of the radio channel information on the candidate BWP (e.g., target BWP) as well as the current BWP used for communications between the base station and the terminal. For example, the base station may transmit a candidate BWP list, information indicating resources used for measuring the radio channel state in the candidate BWP (e.g., target BWP), and information indicating resources used for reporting the measurement result of the radio channel state in the candidate BWP (e.g., target BWP) to the terminal.

When the measurement/reporting procedures of the radio channel information on the candidate BWP (e.g., target BWP) are requested, the terminal may measure the radio channel state in the candidate BWP (e.g., target BWP) and report the measurement result (i.e., radio channel information) to the base station. The base station may receive the measurement result (i.e., radio channel information) for the candidate BWP (e.g., target BWP) from the terminal and determine the changeable BWP (e.g., one or more candidate BWPs among whole candidate BWPs). The base station may inform the terminal of the changeable BWP. Also, the base station may prepare the data allocation in the currently operating BWP and the destination BWP (i.e., changeable BWP) based on the measurement result (i.e., radio channel information) in advance.

When the current BWP is changed to the candidate BWP determined by the base station, the communication node (e.g., base station and terminal) may change the BWP based on the BWP changing methods 1-4 described above.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   receiving bandwidth part (BWP) change information from a base station in a BWP i;
   changing an operation BWP of the terminal from the BWP i to a BWP j even when a transmission and reception procedure of first data in the BWP i is not completed at a BWP changing time corresponding to the BWP change information;
   performing the transmission and reception procedure of first data in the BWP j; and
   performing a transmission and reception procedure of second data in the BWP j when the transmission and reception procedure of first data is completed,
   wherein the BWP i and the BWP j are different BWPs, and i and j are different integers.

2. The operation method according to claim 1, wherein the BWP change information is received through at least one of a radio resource control (RRC) message, a medium access control (MAC) control element (CE), and a downlink control channel.

3. The operation method according to claim 1, wherein the BWP change information is received together with resource allocation information for the data through a downlink control channel.

4. The operation method according to claim 1, wherein the BWP change information includes a BWP change notification indicating that a BWP change is requested, information indicating the BWP changing time, and information indicating a new BWP.

5. The operation method according to claim 1, wherein the information indicating the BWP changing time indicates one of a starting point of a slot, a starting point of a subframe, a starting point of a transmission time interval (TTI), an ending point of a guard period (GP), and a starting point of an uplink transmission period.

* * * * *